United States Patent
Cantwell et al.

(10) Patent No.: US 11,058,092 B2
(45) Date of Patent: Jul. 13, 2021

(54) ANIMAL CRATE WITH SWING OR DROP DOOR

(71) Applicant: Mid-West Metal Products Co., Inc., Muncie, IN (US)

(72) Inventors: Brad Cantwell, Muncie, IN (US); Stew Kerr, Muncie, IN (US); Michael E. Greene, Muncie, IN (US)

(73) Assignee: MID-WEST METAL PRODUCTS COMPANY, INC., Muncie, IN (US)

( * ) Notice: Subject to any disclaimer, the term of this patent is extended or adjusted under 35 U.S.C. 154(b) by 54 days.

(21) Appl. No.: 14/947,045

(22) Filed: Nov. 20, 2015

(65) Prior Publication Data

US 2017/0142927 A1 May 25, 2017

(51) Int. Cl.
*A01K 1/00* (2006.01)
*A01K 1/03* (2006.01)
*A01K 31/02* (2006.01)
*A01K 1/02* (2006.01)

(52) U.S. Cl.
CPC .............. *A01K 1/03* (2013.01); *A01K 1/0245* (2013.01); *A01K 1/034* (2013.01); *A01K 31/02* (2013.01)

(58) Field of Classification Search
CPC .......... A01K 1/03; A01K 1/033; A01K 1/034; A01K 31/06; A01K 31/07; A01K 31/08
See application file for complete search history.

(56) References Cited

U.S. PATENT DOCUMENTS

| | | |
|---|---|---|
| 899,084 A | 9/1908 | Tholts et al. |
| 3,330,254 A | 7/1967 | Kurtz et al. |
| 3,348,723 A * | 10/1967 | Wilson ................... B65D 19/12 108/53.5 |
| 3,556,058 A | 1/1971 | Smiler |
| 3,791,347 A | 2/1974 | Lovell |
| 3,896,766 A | 7/1975 | Martin |
| 4,023,698 A | 5/1977 | Raymond |
| 4,629,086 A | 12/1986 | Trubiano |
| 4,763,606 A | 8/1988 | Ondrasik |

(Continued)

OTHER PUBLICATIONS

"Majestic Pet 'Titan' Single Door Folding Dog Crate". Found online May 9, 2016 at overstock.com. Page dated Dec. 4, 2007. Retrieved from http://www.overstock.com/Pet-Supplies/Majestic-Pet-Titan-Single-Door-Folding-Dog-Crate/2680102/product.html.

(Continued)

*Primary Examiner* — Thanh Pham
(74) *Attorney, Agent, or Firm* — Taft Stettinius & Hollister LLP; Stephen F. Rost

(57) ABSTRACT

An animal enclosure including a plurality of members defining an interior of the enclosure. The plurality of members includes a first member having a frame and a door formed by a plurality of interconnected horizontal and vertical wires. The door is pivotable with respect to the frame and a latch maintains the door in a closed position when latched. At least one of the wires of the door assembly is configured to include one of an access portion and a tab, and at least one of the wires of the frame assembly includes the other of the access portion and the tab. The latch, when moved to an open position, enables sliding movement of the door with respect to the frame. Alignment of the access portion and tab provides for opening of the door and pivoting movement of the door with respect to the frame.

22 Claims, 19 Drawing Sheets

(56) References Cited

U.S. PATENT DOCUMENTS

| | | | |
|---|---|---|---|
| 4,770,127 A * | 9/1988 | Volk .................... | A01K 1/0613 |
| | | | 119/473 |
| D300,377 S | 3/1989 | Willingham | |
| 5,101,995 A | 4/1992 | Trubiano | |
| 5,233,939 A | 8/1993 | Randolph | |
| 5,373,810 A * | 12/1994 | Martin ................... | A01K 31/10 |
| | | | 119/459 |
| D367,734 S | 3/1996 | Sharp | |
| 5,626,098 A | 5/1997 | Askins | |
| 5,845,432 A | 12/1998 | Tully | |
| 6,092,488 A | 7/2000 | Allawas | |
| 6,192,834 B1 | 2/2001 | Kolozsvari | |
| 6,230,655 B1 | 5/2001 | Cohen et al. | |
| 6,581,545 B1 | 6/2003 | Foster | |
| 6,681,720 B1 | 1/2004 | Skurdalsvold et al. | |
| 7,918,188 B1 * | 4/2011 | Harper ................. | A01K 1/0245 |
| | | | 119/481 |
| D652,999 S | 1/2012 | Jakubowski | |
| D668,397 S | 10/2012 | Cantwell | |
| D672,511 S | 12/2012 | Cantwell | |
| D673,737 S | 1/2013 | Cantwell | |
| 8,408,416 B2 | 4/2013 | Cheng-Lung | |
| D690,474 S | 9/2013 | Cantwell | |
| D695,588 S | 12/2013 | Cantwell | |
| D715,006 S | 10/2014 | Pomerantz | |
| D715,501 S | 10/2014 | Cantwell | |
| 2004/0134444 A1 | 7/2004 | Shiever et al. | |
| 2005/0034679 A1 | 2/2005 | Link | |
| 2006/0112897 A1 | 6/2006 | Moore | |
| 2007/0000447 A1 | 1/2007 | Jakubowski et al. | |
| 2008/0245313 A1 | 10/2008 | Jakubowski et al. | |
| 2010/0282179 A1 | 11/2010 | Ho | |
| 2012/0210947 A1 | 8/2012 | DiPaolo | |
| 2012/0227328 A1 | 9/2012 | Link | |
| 2014/0109839 A1 | 4/2014 | Cantwell et al. | |
| 2014/0116347 A1 | 5/2014 | Casto et al. | |
| 2014/0202395 A1 * | 7/2014 | Cantwell ............... | A01K 1/0236 |
| | | | 119/474 |
| 2014/0209036 A1 * | 7/2014 | Cantwell ................ | A01K 1/032 |
| | | | 119/481 |
| 2014/0216354 A1 * | 8/2014 | Cantwell ............... | A01K 1/0017 |
| | | | 119/481 |
| 2015/0305297 A1 | 10/2015 | Link | |
| 2016/0014996 A1 | 1/2016 | Link et al. | |
| 2016/0024824 A1 | 1/2016 | Link et al. | |

OTHER PUBLICATIONS

"Midwest iCrate Pet Crates". Found online May 9, 2016 at amazon. com. Page dated Dec. 12, 2007. Retrieved from http://www.amazon.com.MidWest-iCrate-Double-Door-Folding-Inches/dp/B000QFT1RC/ref=cm_cr_arp_d_product_top?le=UTF8.

* cited by examiner

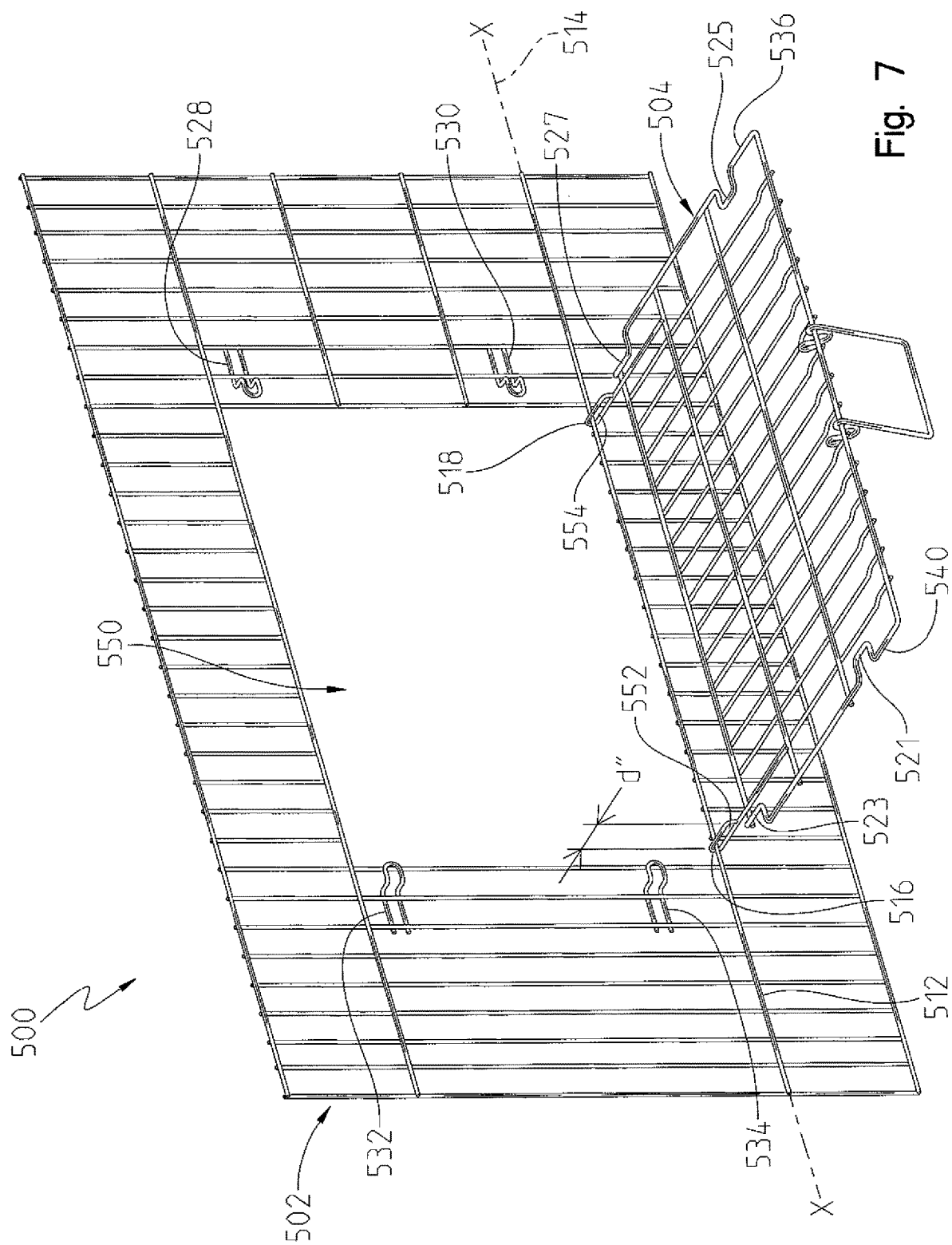

ANIMAL CRATE WITH SWING OR DROP DOOR

FIELD OF THE INVENTION

The present invention relates to an animal enclosure, and, in particular, to an animal crate having a swinging door or a drop door.

BACKGROUND

The use of animal cages or crate is well known. Many conventional cages have been developed over the years for housing animals of different shapes and sizes. For instance, animal cages typically house dogs and cats. Rabbits, rodents and other small animals have also been known to be housed by such cages and are quite common. In fact, such cages are also used for farm animals when needed, including ducks and chickens. As cages have been further developed, the portability and ease of use have become points of emphasis. Some conventional cages, for example, have been designed to collapse to a compact structure for portability. Others have been designed to be of light weight and from durable materials. Conventional cages have been designed for ease of transporting an animal. Some conventional cages are designed as exercise pens that provide an interior space that the animal can move about, particularly outdoors.

Most conventional cages include at least one door for providing access to the interior of the cage. The animal enters or exits the cage through an opening when the door is opened, and the animal can be safely contained in the cage when the door is closed. Many conventional cages include a door that is attached to the cage with a hinge. In some conventional cages, the doors swing from a side of the cage and in others the door swings from the bottom or top of the cage. This allows the door to be swung from a closed position to an open and vice versa. In cages with side or top swinging doors, the animal can walk into the cage. In cages with bottom swinging doors, the animal is typically placed into and removed from the cage by the owner, A variety of latches have been incorporated into the design of the door to allow a user to open, close, and or securely latch the door.

Many of these conventional designs have limitations, however. With regards to an exercise pen, for example, the door is generally formed by an entire height and width of a panel or side member of the pen. Many of these doors are not able to be securely latched or may not prevent an animal from escaping the enclosure. In addition, due to the size of the door, it can be difficult for an owner to reach into the interior of the exercise pen and retrieve a desired animal when two or more animals are enclosed therein.

Therefore, a need exists for an improved animal enclosure that provides better means for accessing the interior of the enclosure which overcomes some of the above-mentioned limitations in the prior art.

SUMMARY

In one exemplary embodiment of the present disclosure, there is provided an animal enclosure including a plurality of members defining an interior of the enclosure, where the plurality of members includes at least a first member. A frame of the first member includes a plurality of interconnected wires that define an opening for an animal to pass therethrough and to enter or exit the interior of the enclosure. A door of the first member includes a plurality of interconnected wires and is coupled to the frame. The door is pivotable about a pivot wire of the frame to move between an open position and a closed position. A latch assembly includes a handle structure, where the handle structure is configured to pivot with respect to one of the door and the frame and to latch the door in a closed position with respect to the frame. A door stop includes an access portion and a tab, wherein one of the frame and the door includes the access portion and the other of the frame and the door includes the tab, wherein an alignment of the access portion and the tab enables pivotable movement of the door with respect to the frame from the closed position to the open position.

In another embodiment, there is provided a door assembly for an animal enclosure including a frame having a plurality of interconnected horizontal and vertical wires that defines an opening for an animal to pass therethrough and to enter or exit the interior of the enclosure. A door includes a plurality of interconnected horizontal and vertical wires and is coupled to the frame. The door is pivotable about a pivot wire of the frame to move between an open position and a closed position. A latch assembly includes a handle structure, where the handle structure is configured to pivot with respect to one of the door and the frame and to latch the door in a closed position with respect to the frame. A door stop includes an access portion and a tab, wherein one of the frame and the door includes the access portion and the other of the frame and the door includes the tab.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 7 is a perspective view of the door assembly of FIG. 6 in an open position;

Corresponding reference numerals are used to indicate corresponding parts throughout the several views.

DETAILED DESCRIPTION

The embodiments of the present invention described herein are not intended to be exhaustive or to limit the invention to the precise forms disclosed in the following detailed description. Rather, the embodiments are chosen and described so that others skilled in the art appreciate and understand the principles and practices of the present invention.

The present invention relates to an animal enclosure. The animal enclosure can be used for multiple purposes, such as to contain one or more animals or objects. The enclosure can be made of any size for accommodating an animal or object of any size. In addition, the enclosure can be made of different materials including aluminum, plastic, and steel. The enclosure can be designed as an animal cage to define an interior that is surrounded at all sides, or it can be designed as an exercise pen in which at least one side is not present, for instance a top side.

Figure 1:
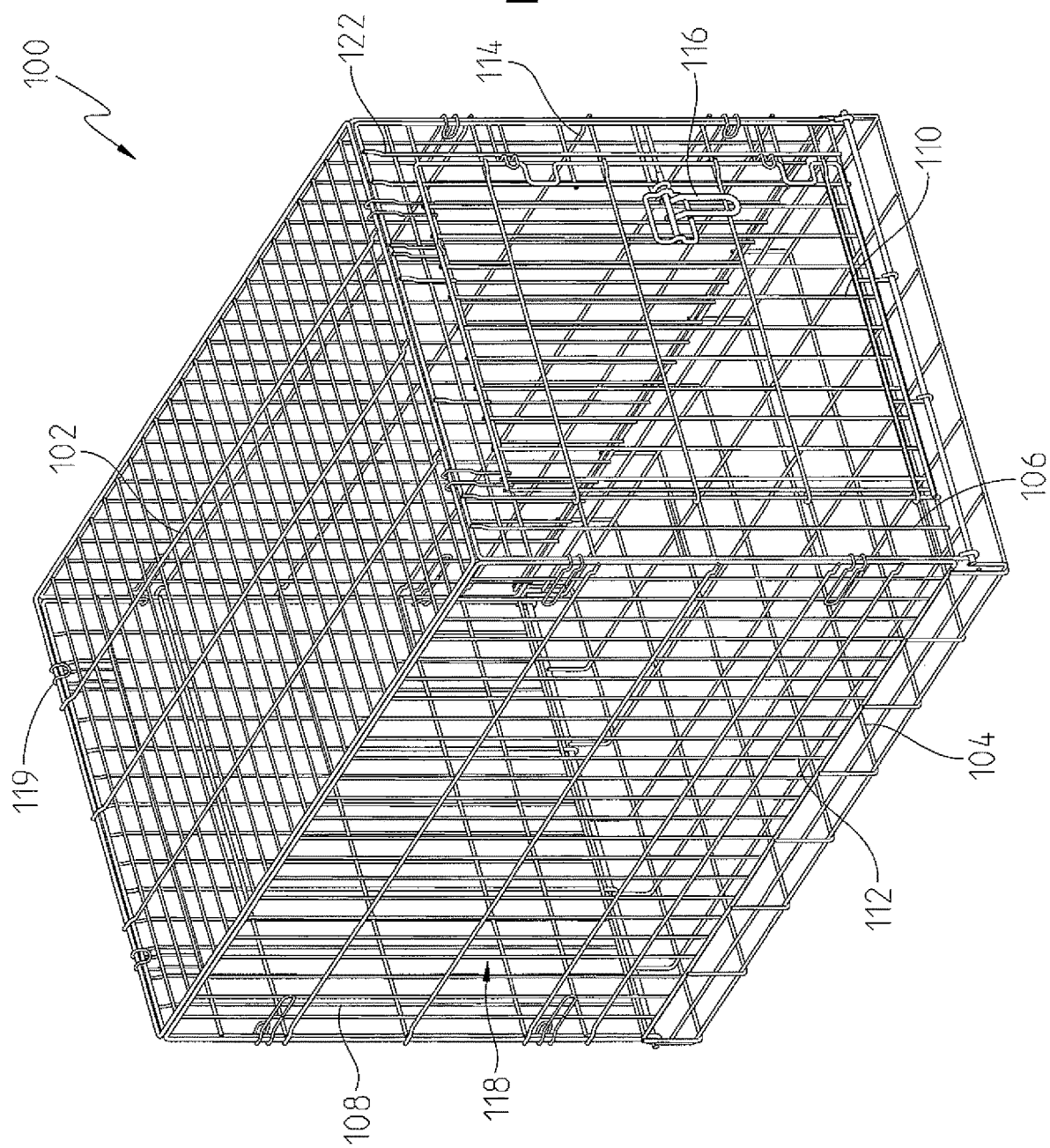
FIG. 1 is a perspective view of an animal enclosure.

Referring to FIG. 1, an exemplary embodiment of an animal enclosure 100 is shown. The enclosure 100 is in the form of an exercise pen, but this is only intended to be exemplary. The enclosure 100 can be formed of substantially horizontal and vertical wires that overlap one another to define an interior portion 118. One or more of the horizontal wires can be coupled to one or more of the vertical wires, and vice versa, to add structural integrity to the enclosure 100. In other embodiments, wires are oriented in other directions than horizontal and vertical. The wires may be welded, adhered, fastened, or coupled to one another through a variety of means. The enclosure 100 can include a plurality of sides or members that form the enclosure 100.

In FIG. 1, for example, the enclosure 100 includes a top member 102, a bottom member 104, a front member 106, and a rear member 108. The front member 106 includes a door assembly 110 which opens and closes to provide access to the interior of the enclosure 100. The enclosure 100 also includes a first side 112 and a second 114. A latch 116 is operatively connected to the door assembly 110 and is configured to maintain the door assembly 110 in the closed position when latched. Each individual member, in different embodiments, is coupled to an adjacent member via one or more of a fastener, clip, latch, or other means. For instance, in FIG. 1, each member is coupled to an adjacent member by use of one or more clips 119. Vertical or horizontal wires of the respective member can be rotatably disposed within the clip to allow the enclosure, of any number of sides, to be configured in a desired manner. While the illustrated embodiment depicts eight sides, other embodiments may include any number of sides. In this manner, a user may assemble the enclosure to any desired shape based on the size of the animal, object etc. being contained therein.

With respect to the enclosure 100, the front member 106 is shown having the door 110. The door 110 is coupled to a frame 122 defined by the front member 106, such that the door 110 can be configured to move between the open position and the closed position. For instance, the door assembly 110 can be pivotally coupled to the frame 122 so that the door 110 can pivot from one position to the other position and in between. Moreover, other members can include a door. Although only one door 110 is shown in FIG. 1, in other embodiments two or more door assemblies for accessing the interior of the enclosure 100 are included.

Figure 2:
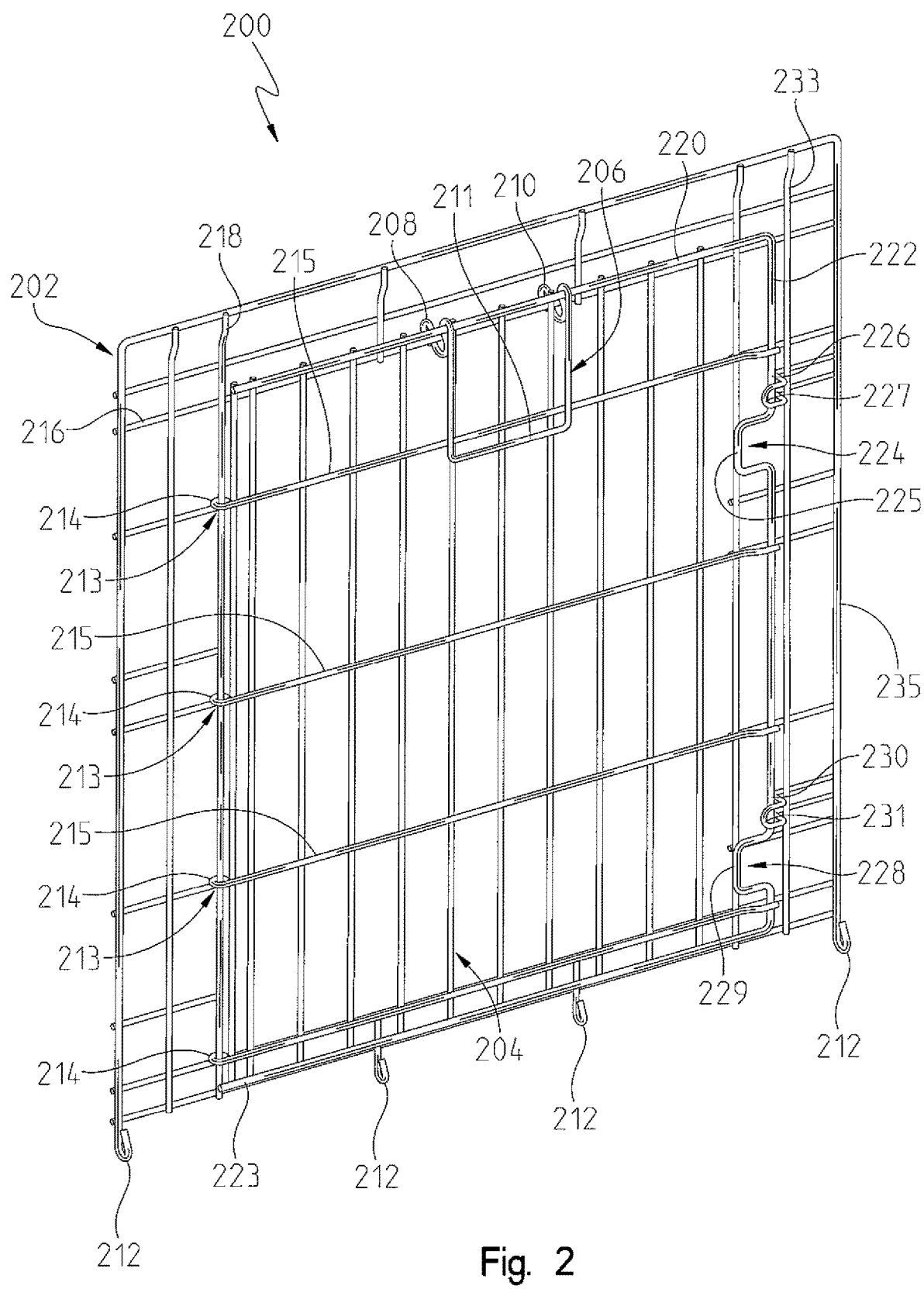
FIG. 2 is a perspective view of a door frame and door assembly of the animal enclosure of FIG. 1 with a latch in a latched position.

Referring to FIG. 2, the first member 106 and its door 110 are shown in greater detail as door assembly 200. The door assembly 200 includes a frame 202 which supports a pivotable door 204. The frame 202 defines an opening which is spanned by the door 204, where the opening provides for entry to and exit from the interior of the enclosure 100. In this embodiment, the door 204 is movable between the closed position (e.g., FIG. 2) and the open position (e.g., FIG. 4). Moreover, the door 204 is moveable between the open position and closed position relative the frame 202.

The door assembly 200 includes a handle or latch assembly 206 operatively connected to the door 204 for releasably engaging with the frame 202. The latch assembly 206 includes a first curved end 208 and a second curved end 210 configured to engage a horizontal wire 216 of the frame 202. In other embodiments, latch assembly 206 includes a single curved end. A handle portion 211 of the latch assembly 206 provides a gripping surface for opening and closing the latch. The horizontal wire 216 is fixedly coupled to a vertical wire 218, one of the vertical wires provided by the frame 202. The door assembly 200 includes a plurality of horizontal wires 215, some of which terminate in a hook 213 having a curved end 214, which is configured to wrap around the vertical wire 218 to enable pivoting movement of the door 204 about the wire 218 and to enable sliding movement of the door 204 along the wire 218. Movement of the latch 206 about a top horizontal wire 220 of the door 204 engages or disengages the latch 206 from the horizontal wire 216. When engaged, the latch 206 restricts the door 204 from opening. When disengaged, the latch 206 is positioned to allow the door 204 to be pivoted to the open position. A plurality of hooks 212 extend from the vertical wires of the frame 202 which position the frame 202 with respect to the bottom member 104 of the enclosure 100. See FIG. 1.

The door 204 further includes a vertical wire 222 and a bottom horizontal wire 223. In the illustrated embodiment, the wire 220, wire 222, and wire 223 are a single piece of wire which is bent to shape and defines part of the outer perimeter of the door 204. In other embodiments, the wires 220, 222, and 223 are formed of two or more pieces of wire.

The frame 202 and door 204 are formed to provide a door stop 224 which is configured to substantially prevent the door 204 from being pivoted about the horizontal wire 218, even in the event that the latch 206 is disengaged from the horizontal wire 216. The door stop 224 includes an access portion 225, which in the embodiment of FIG. 2 is a slot defined by the vertical wire 222, and a blocking portion 226, defined by a length of the vertical wire 222. The door stop 224 further includes a tab 227 coupled to the frame 202 at a vertical wire 233 and a vertical wire 235. A second door stop 228 includes an access portion 229 and a blocking portion 230 defined by the vertical wire 222. A tab 231, coupled to the frame 202, is provided as part of the door stop 228 in the embodiment of FIG. 2. Both of the access portions 225 and 229 are generally configured as a "U" shape when viewed along the plane of the door 204.

Figure 3:
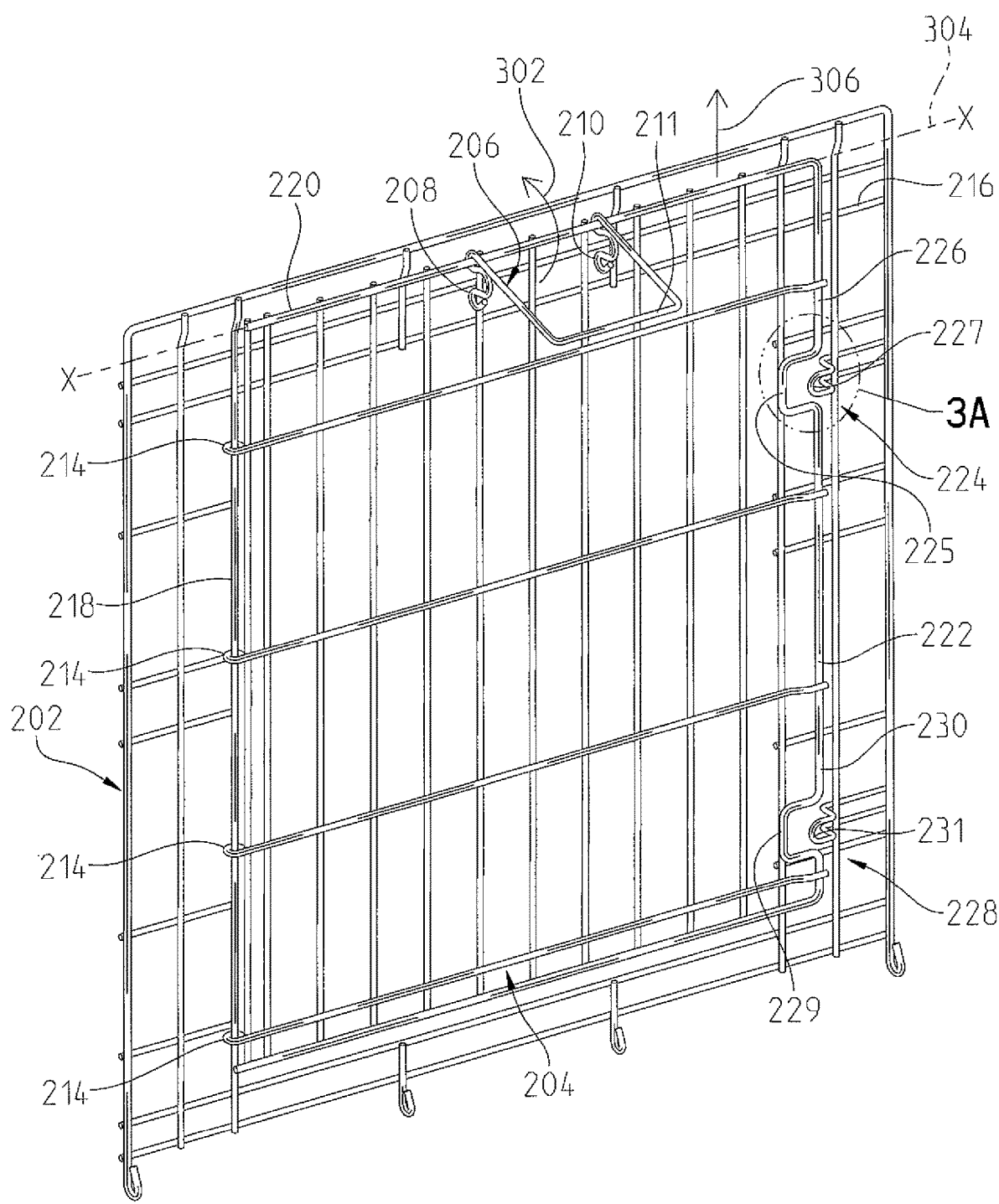
FIG. 3 is a perspective view of the door frame and door assembly of FIG. 2 with a latch in an unlatched position.

As shown in FIG. 3, the latch assembly 206 can be disengaged or unlatched from the horizontal wire 216 by moving the handle portion 211 along direction 302. In doing so, the latch assembly 206 is pivotally uncoupled from the horizontal wire 216 disposed on the frame 202. As the handle portion 211 is moved away from the door 204, the first and second curved ends 208 and 210 pivot about an X-axis 304 defined by the horizontal wire 220. Once the latch 206 is disengaged from the frame 202, the door 204 is free to move along the plane defined frame 202 in the direction 306. Since each of the wrapped ends 214 are located between adjacent horizontal wires of the frame 202, the door 204 is configured to slidingly move along the direction 306, as well as in the opposite direction, but is restricted in movement when one, or more, of the wrapped ends 214 comes into contact with one of the horizontal wires of the frame 202.

By moving the door 204 in the direction 306a predetermined distance, the access portion of each of the door stops 224 and 228 is aligned with the tabs 227 and 231, which permits movement of the door 204 with respect to the frame 202 about the vertical wire 218. As can be seen in FIG. 3, the access portion 225 is horizontally aligned with the tab 227 and the access portion 229 is horizontally aligned with the tab 231. As can be seen in FIG. 2, the door 204 is in a first position with respect to the frame 202, such that the blocking portions 226 and 230 are horizontally aligned with the respective tabs 229 and 231. In this position, attempted movement of the door 204 about the vertical wire 218 is blocked or prevented from opening since any pivotal movement of the door is restricted when the blocking portions come into contact with the tabs.

As can be seen in FIG. 2, the weight of the door 204 provides a self-locating function which places the door 204 in a position which substantially prevents opening of the door 204, should the latch 206 be located in an unlatched position. In this way, the arrangement of the access portions, the blocking portions and the tabs provide a degree of safety for the owner and the animal occupant of the enclosure. To open the cage, not only must the latch be unlatched, but the door 204 must be moved in the direction 306 to position the access portion relative to the tabs as illustrated in FIG. 3.

Figure 3A:
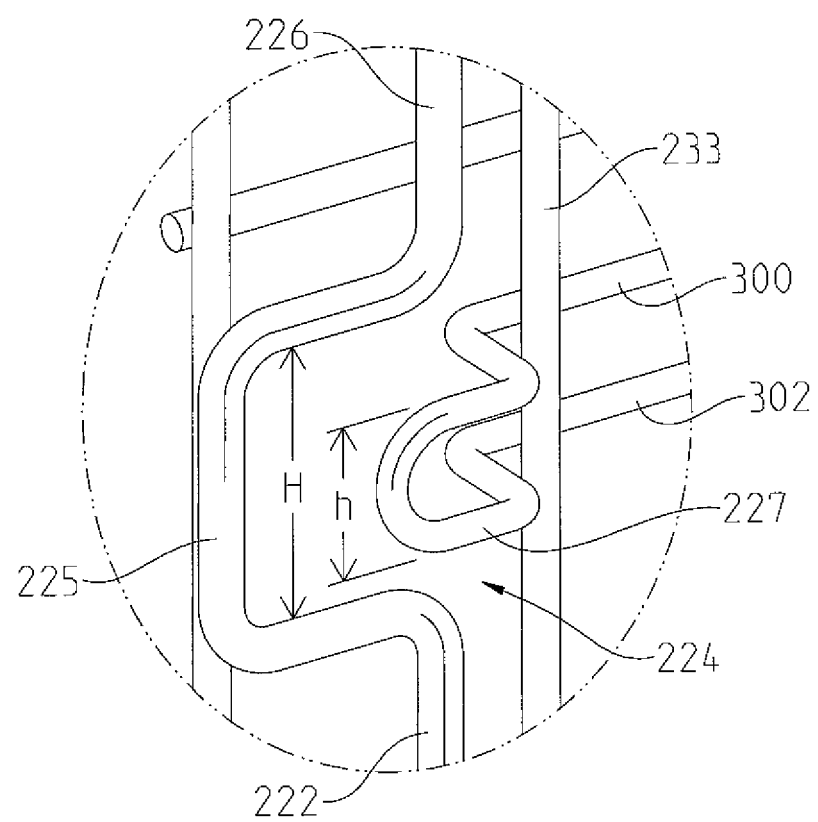
FIG. 3A is a perspective view of a door stop or catch of FIG. 3.

FIG. 3A illustrates the door stop 224 which includes the access portion 225, the blocking portion 226, and the tab 227. In one embodiment, the tab 227 is formed of a single piece of wire which is connected to the vertical wire 233 and the vertical wire 235. The tab 227 includes a first leg 300 and a second leg 302 which terminate at the tab 227 which includes multiple bends configured to place the tab 227 at a plane which is displaced from the plane of the frame 202. By spacing the tab 227 from the plane of the frame 202, the door 204 can be moved vertically with respect to the frame 202. The tab 227 defines a distance or a height "h" which is less than a distance of a height "H" defined by the access portion 225. In this configuration, therefore, the access portion 225 moves past the tab 227 when the door 204 is opened. With the door in this position, the blocking portion 226 is vertically displaced from the tab 227 and does not therefore prevent the door 204 from being opened. The door stop 228 is similarly configured as this configuration of FIG. 3A.

Figure 4:
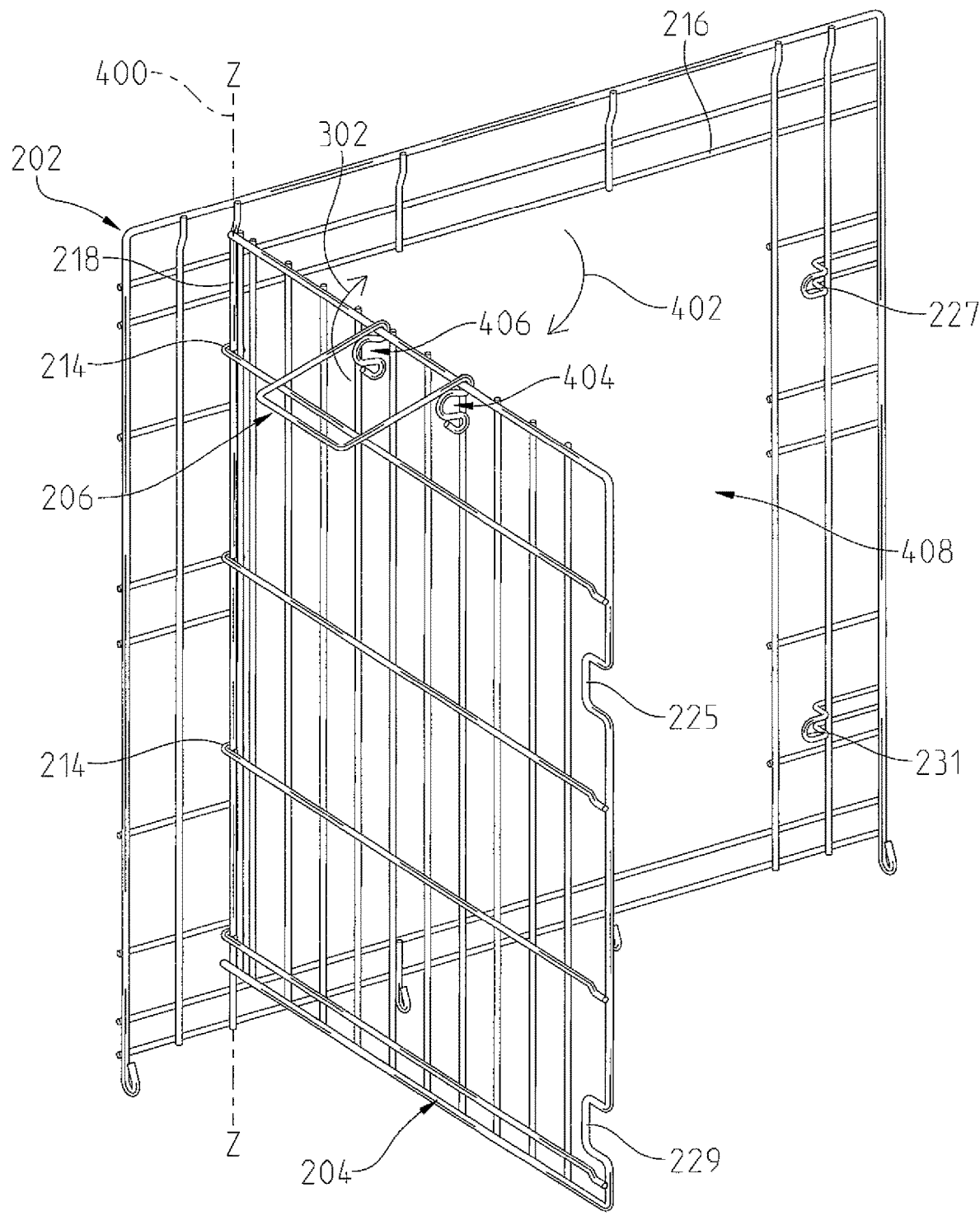
FIG. 4 is a perspective view of the door frame and door assembly of FIG. 2 with the door in an open position.

FIG. 4 illustrates the door 204 in the open position which is enabled by movement of the door 204 in the direction 306 as described with respect to FIG. 3. By moving the door 204 in the direction 306, the tabs 227 and 231 do not prevent the door 204 from pivoting about the vertical wire 218 which defines a vertical pivot Z axis 400. Movement of the door 204 in a direction 402 is facilitated by movement of the latch 206 in the direction 302 which disengages a first receptacle 404 and a second receptacle 406 from the horizontal wire 216. Opening of the door 204 provides an entrance/exit opening 408 for the animal.

Figure 5:
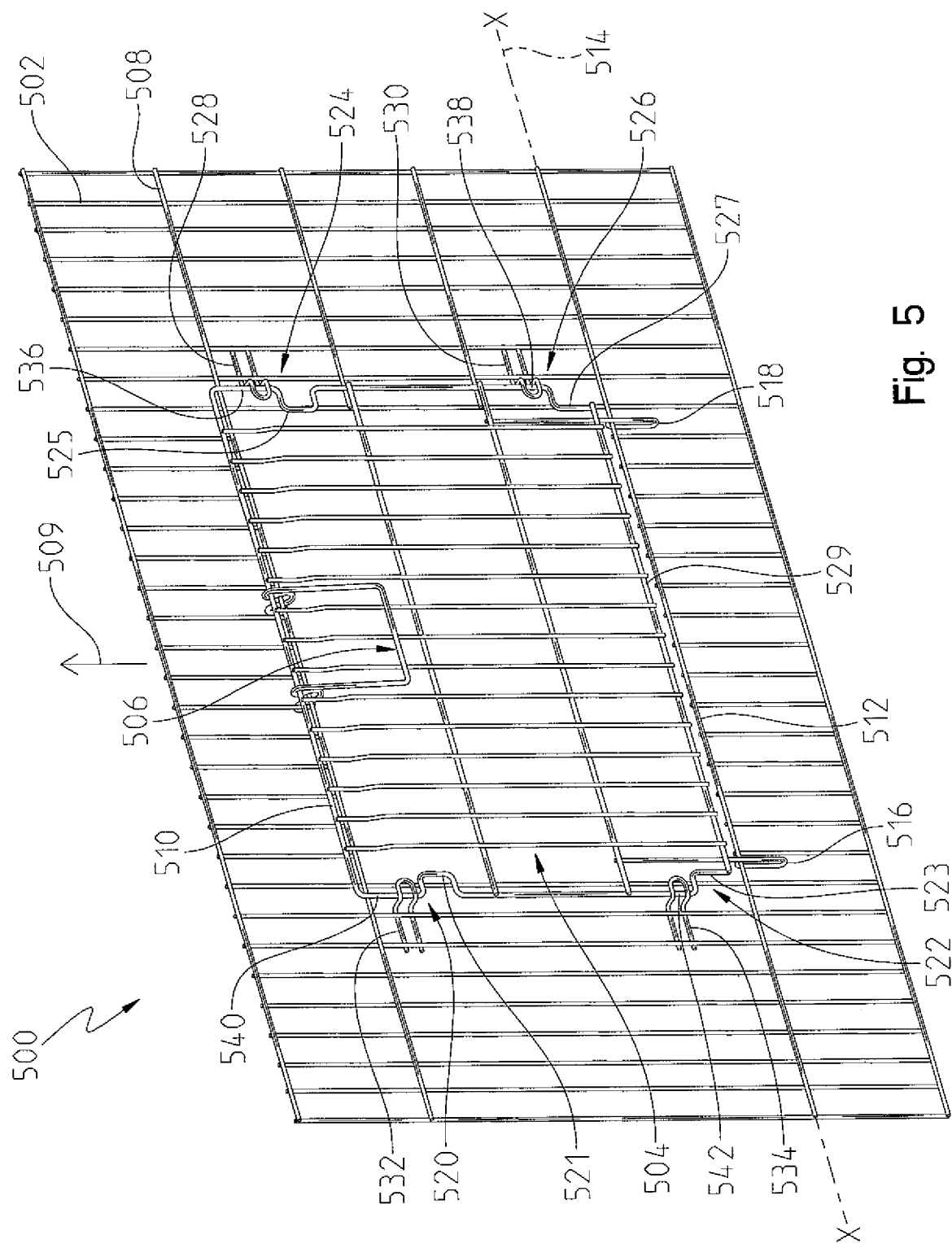
FIG. 5 is a perspective view of another embodiment of a door frame and door assembly.

FIG. 5 illustrates another embodiment of a door assembly 500 which includes a frame 502 and a door 504. A latch 506 is operatively connected to the door 504 which engages a horizontal wire 508 of the frame 502 to latch the door 504 in a closed position. The latch 506 pivots about a horizontal wire 510 to which it is operatively connected.

To open the door 504 in this embodiment, the latch 506 is moved outwardly from the plane of the door 504 and upwardly to disengage the latch 506 from the horizontal wire 508. At some point, continued upward movement of the latch 506 places the latch 506 in a position where the latch can be pulled upwardly generally in a direction 509. Continued movement of the latch 506 in the direction 509 moves the door 504 in the same direction to enable pivotal movement of the door about a horizontal wire 512 of the frame 502 which defines an X pivot axis 514. The door 504 includes a first hook 516 and a second hook 518, each of which defines a slot through which the horizontal wire 512 extends. Internal ends of each of the slots determine the extent of the upward movement of the door 504 and provide a pivot point about which the door 504 pivots. In this embodiment, therefore, the hooks 516 and 518 define a larger space than the hooks 213 of FIG. 2, which enables the door 504 to move along the frame 502 to align features of a plurality of door stops.

The door assembly 500 includes a plurality of door stops: a first door stop 520, a second door stop 522, a third door stop 524 and fourth door stop 526. Each of the door stops includes an access portion, a blocking portion, and a tab as previously described. In the embodiment of FIG. 5, the door 504 includes access portions 521, 523, 525, and 527. The access portions 521 and 525 include a "U" shape as previously described for the access portions 225 and 229 of FIG. 2. In this embodiment, the access portions 523 and 527 are generally formed as an "L" shaped portion in which the vertically and horizontally extending legs of the "L" define an open portion, where the vertically extending leg is coupled to a horizontal wire 529. The horizontal wire 529 defines the bottom extent of the door 504. In other embodiments, the access portions 523 and 527 are "U" shaped.

Tabs 528, 530, 532, 534 are located on the frame 502. Each of the tabs is configured to block opening of the door, i.e, pivoting of the door about the X axis 514, if the door 504 is located in the location as illustrated in FIG. 5. The weight of the door tends to locate the door in the position illustrated such that the tabs 528, 530, 532, and 534 are disposed adjacently to blocking portions 536, 538, 540 and 542. Even if the latch 506 is moved to the unlatched position, the location of the blocking portions with respect to the tabs prevents the door 504 from being opened sufficiently to provide access to the interior of an enclosure.

Figure 6:
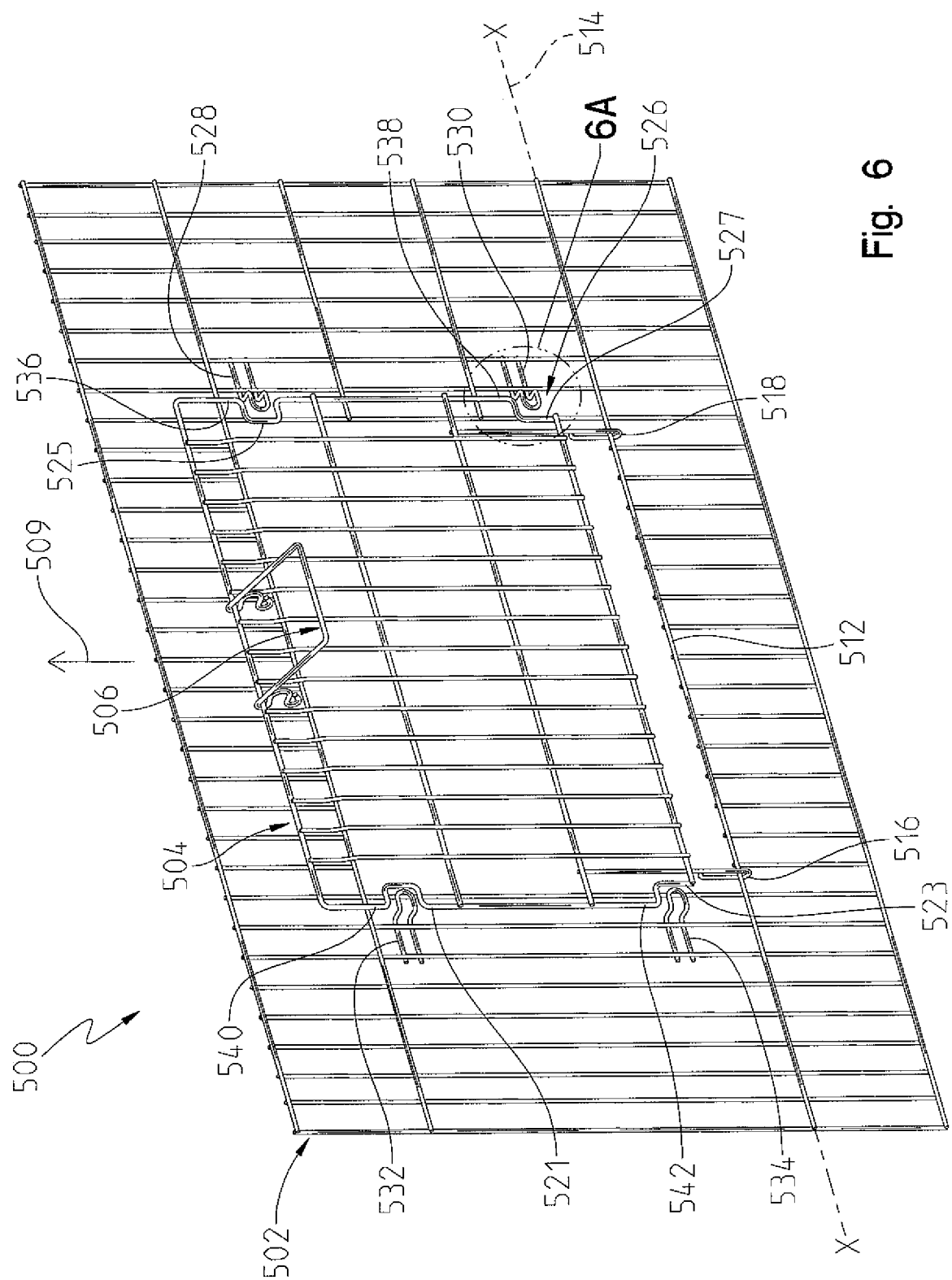
FIG. 6 is a perspective view of the door frame and door assembly of FIG. 5 with a latch in an unlatched position.

FIG. 6 illustrates the door assembly 500 of FIG. 5, where the door 504 has been moved in the direction 509 to align each of the access portions with a corresponding tab. Sliding movement of the door 504 with respect to the frame 502 enables alignment of the access portions with the tabs. Once the tabs are aligned with access portions, the door can be pivoted about the wire 512 to open the door 504. As can be seen, the door 504 is sufficiently raised to place the ends of the slots defined by the hooks 516 and 518 such that the door pivots at the slots. The ends of the slots, however, do not need to be in contact with the horizontal wire 512 to enable pivoting movement of the door 504.

Figure 6A:
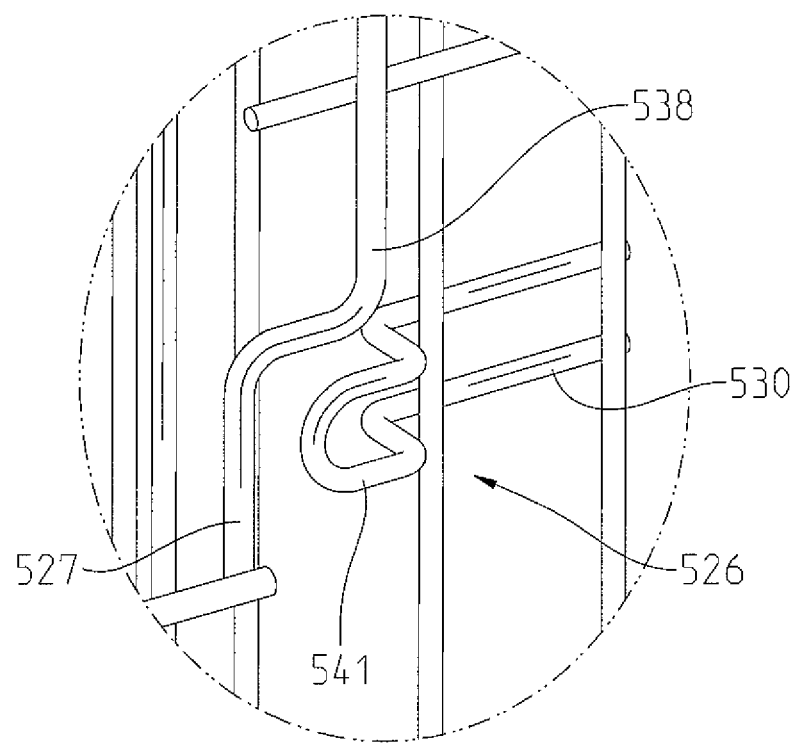
FIG. 6A is a perspective view of a door stop or catch of FIG. 6.

FIG. 6A illustrates a section of FIG. 6 which shows the door stop 526 including the tab 530, the access portion 527, and the blocking portion 538. The tab 530 is formed in a fashion similar to the previously described tabs and includes an extending portion 541, which is displaced from the plane of the frame 502 such that when the door 504 is in the lowered position, the blocking portion 538 prevents the door from opening due to interference with the tab 540. Movement of the door 504 upwardly positions the access portion 527 adjacent to the extending portion 540, but is sufficiently displaced from the extending portion to enable opening of the door 504.

FIG. 7 illustrates the door assembly 500 of FIG. 5 with the door 504 in an open position to allow movement of the animal through an opening 550 defined by the frame 502. In particular, each of the hooks 516 and 518 respectively includes a slot 552 and 554 defining a distance "d". The distance "d" is selected to provide sufficient upward movement of the door 504 with respect to the frame 502 to enable alignment of the access portions with the tabs. It is desirable to define the distance "d" such that upward movement of the door 504 with respect to the frame 502 is limited. In one embodiment, the distance "d" is selected such that contact with an end of one or both of the slots 552 and 554 provides sufficient clearance to open the door 504, without the need to manually align the access portion with the tabs. When the slots are appropriately sized, contact of the ends of the slot with the horizontal wire 512 when the door is moved in the direction 509 provides for accurate alignment of the access portions with the tabs without the need to make further adjustments.

Figure 8:
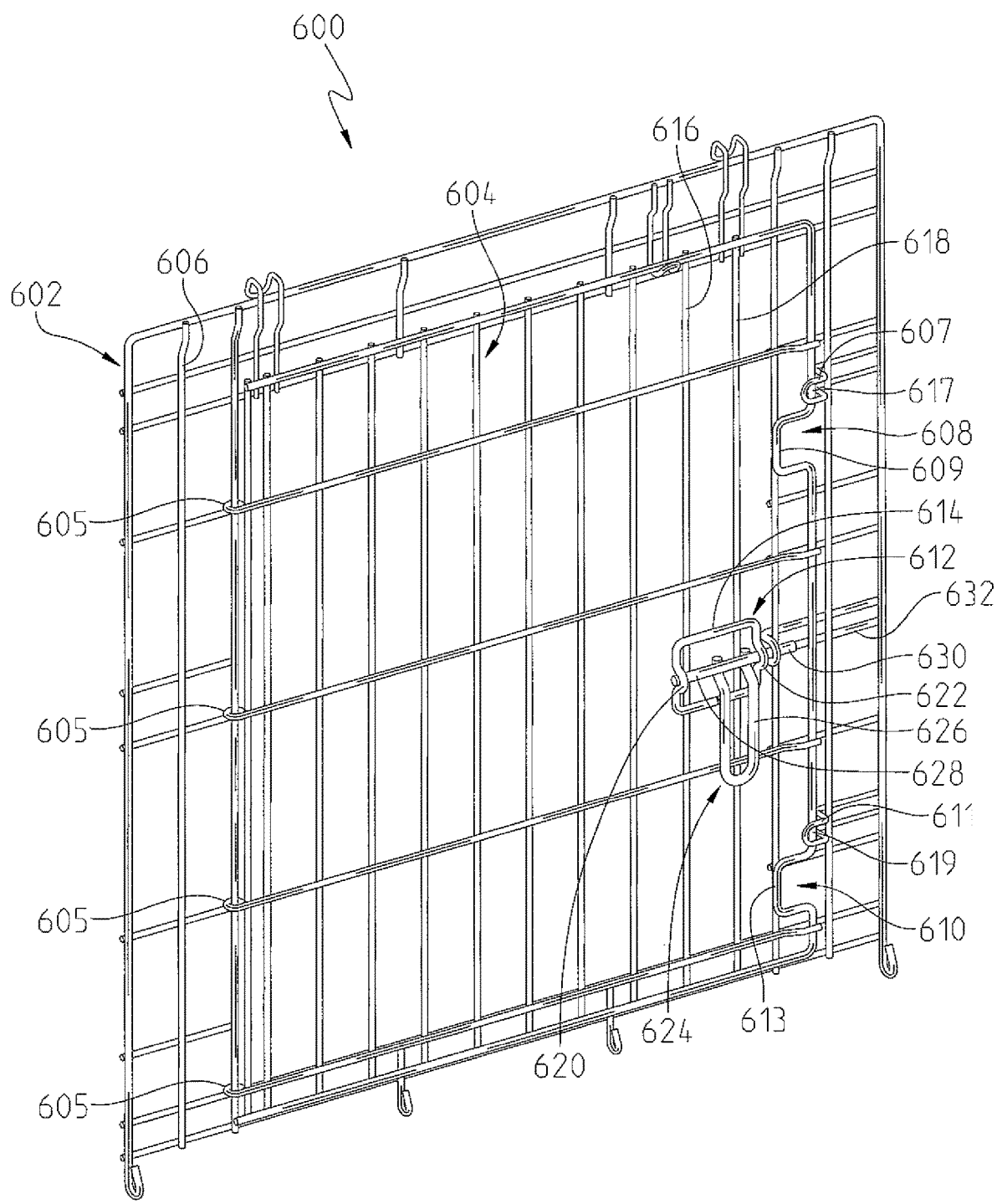
FIG. 8 is a perspective view of another embodiment of a door frame and door assembly.

FIG. 8 illustrates another embodiment of a door assembly 600 including a frame 602 and a door 604. In this embodiment, the door 604 includes a plurality of hooked ends 605 which surround a vertical wire 606 of the frame 602. The door 604 pivots about the vertical wire 606. The door assembly 600 includes a first door stop 608 and a second door stop 610. Each of the door stops 608 and 610 includes an access portion, a blocking portion, and a tab as previously described. Door stop 608 includes a tab 607, an access portion 609, and a blocking portion 617. Door stop 610 includes a tab 611, an access portion 613, and a blocking portion 619. In this embodiment, however, a latch assembly 612 is coupled to the door 604 at a side area of the door opposite the pivoting portion defined by the hooked ends 605.

The latch assembly 612 includes a support 614 which is fixed to a vertical wire 616 and a vertical wire 618 which also provide structure to the door 604. The support 614 is made of wire and includes a bent portion 620 and a bent portion 622 each defining a space between the support 614 and a plane defined the horizontal and vertical wires forming the door 604. The spaces are configured to accept a moveable latch 624 having a handle 626 fixedly coupled to a pin 628. Each of the spaces is sufficiently sized to enable sliding and rotational movement of the handle 626 with respect to the support 614. An end 630 of the pin 628 is configured to extend past the support to engage a tab 632 fixedly coupled to the frame 602. The tab 632 defines a tab aperture 633 (see FIG. 9) which is configured to accept the end 630 of the pin 628 in a latched position. Sliding movement of the pin 628 moves the end 630 into and out of the tab 632.

Figure 9:
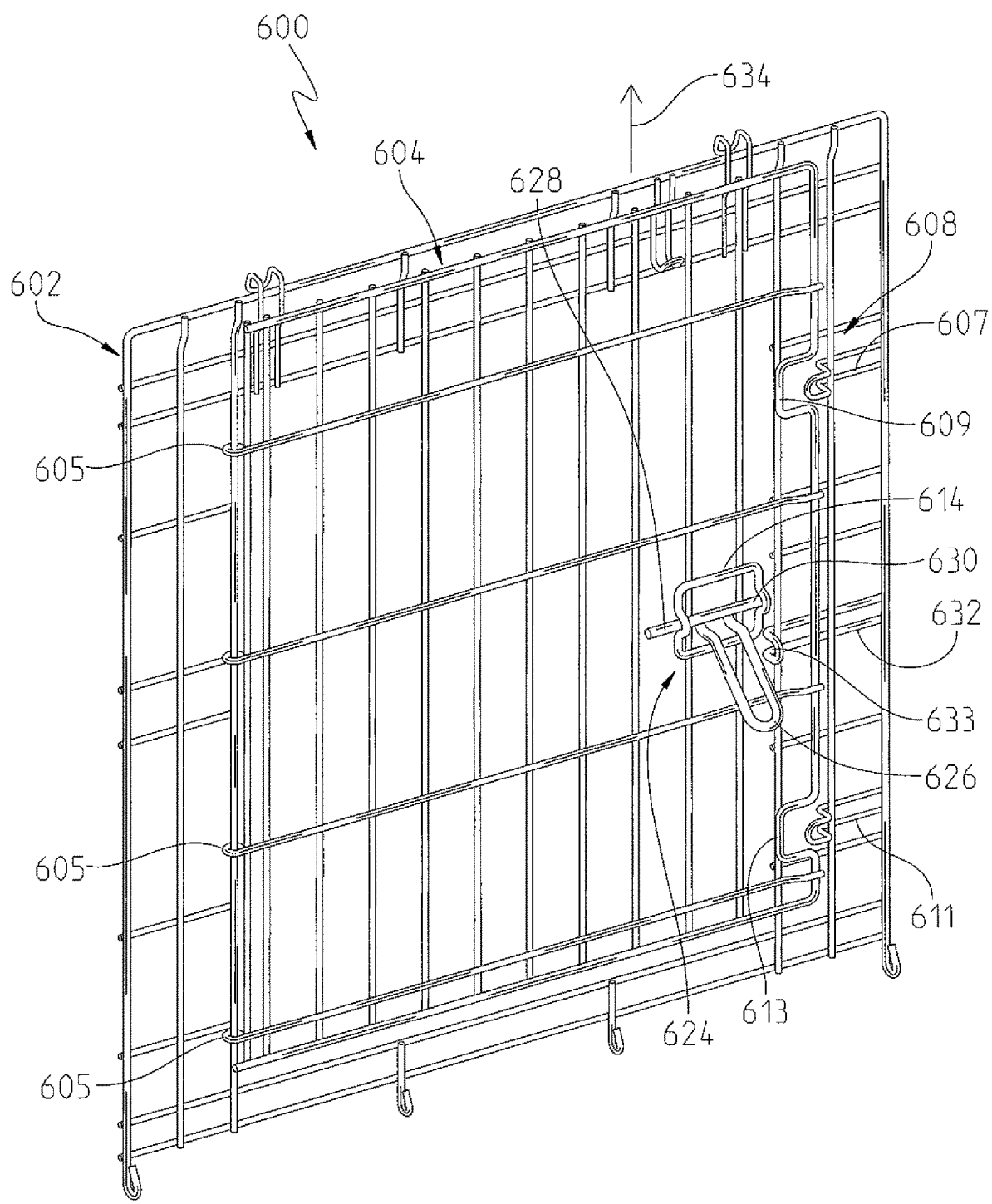
FIG. 9 is a perspective view of a latch of the door assembly of FIG. 8 in an unlatched position.

As further illustrated in FIG. 9, the latch 624 is located in a position in which the end 630 is moved out of the tab aperture 633. The door 604 has also been moved in a direction 634 to align tab 607 with the access portion 609 and tab 611 with access portion 613. Once the opening alignment of the door with respect to the frame has been achieved, the door 604 is moveable from the illustrated closed position to an open position shown in FIG. 10. The open position of the door 604 provides access to the interior the enclosure through an opening 636

Figure 11:
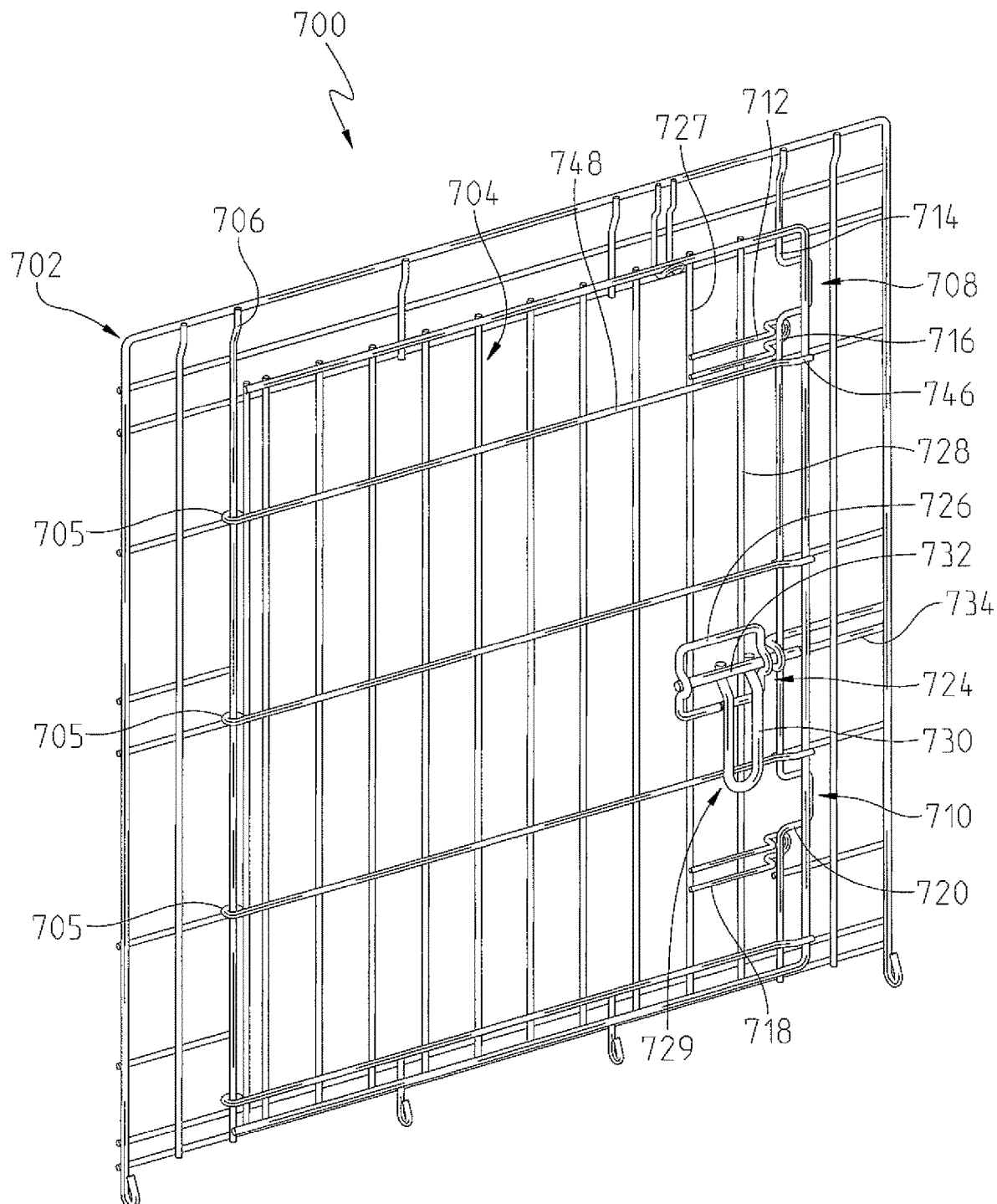
FIG. 11 is a perspective view of another embodiment of a door assembly.

FIG. 11 illustrates another embodiment of a door assembly 700 including a frame 702 and a door 704. In this embodiment, the door 704 includes a plurality of hooked ends 705 which surround a vertical wire 706 of the frame 702. The door 704 pivots about the vertical wire 706. The door assembly 700 includes a first door stop 708 and a second door stop 710. Each of the door stops 708 and 710 includes an access portion, a blocking portion, and a tab as previously described. In this embodiment, however, each of the tabs are fixedly coupled to the door 704 and each of the access portions and blocking portions are configured as part of the frame 702. Door stop 708 includes a tab 712, an access portion 714, and a blocking portion 716. Door stop 710 includes a tab 718, an access portion 720, and a blocking portion 722. As before, the blocking portions 716 and 718 prevent opening of the door 704 when the door is in the lower position as illustrated in FIG. 11.

Figure 10:
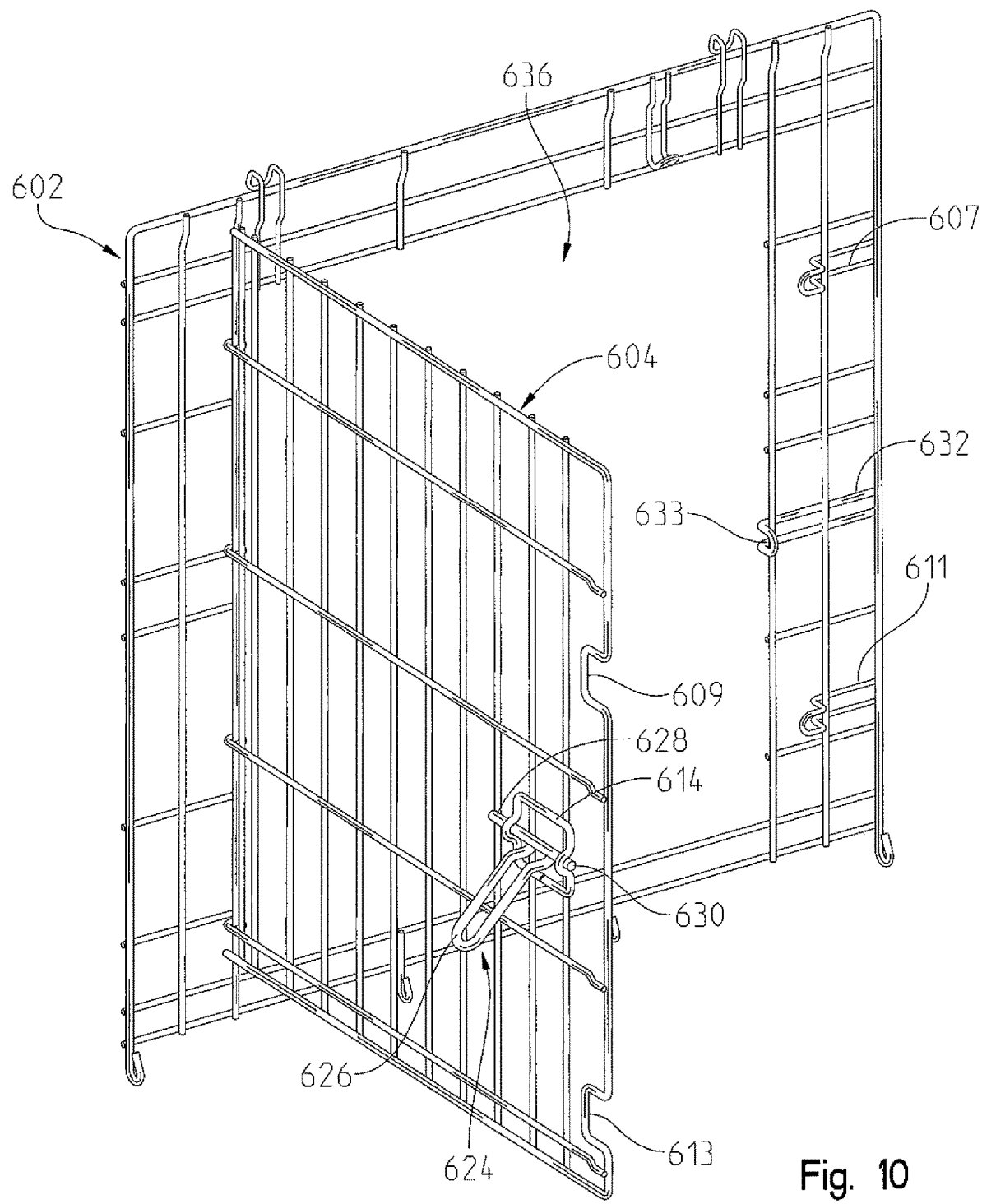
FIG. 10 is a perspective view of the door assembly of FIG. 8 in an open position.

The door 704 includes a latch assembly 724 which is substantially similar in form and function as the latch assembly 624 of FIGS. 8, 9, and 10. The latch assembly 724 includes a latch support 726 which is fixed to a vertical wire 727 and a vertical wire 728 which also provide structure to the door 704. The latch support 726 supports a moveable latch 729 having a handle 730 fixedly coupled to a pin 732. The pin slidingly engages a tab 734 as previously described.

Figure 12:
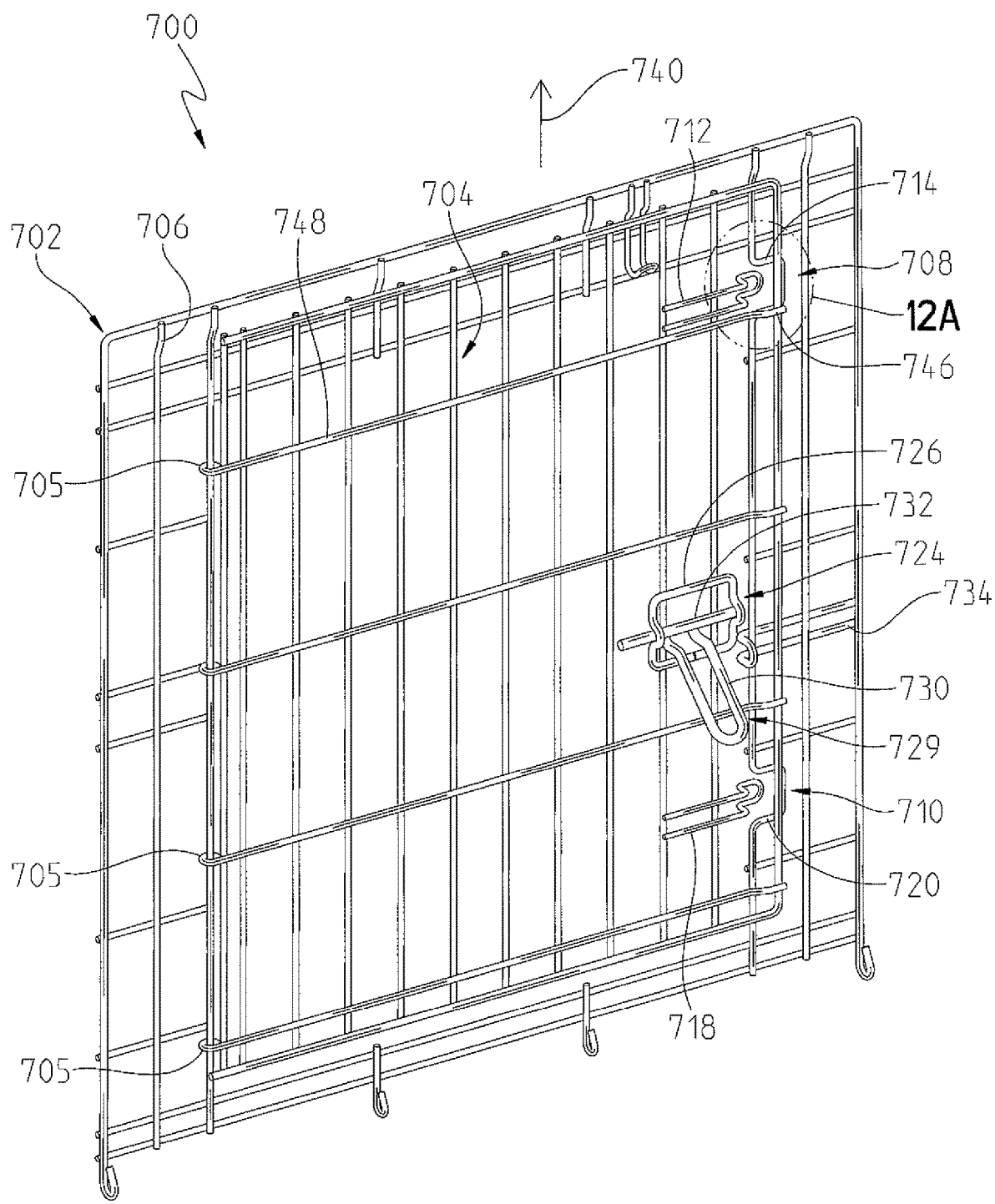
FIG. 12 is a perspective view of a latch of the door assembly of FIG. 11 in an unlatched position.

FIG. 12 illustrates the door 704 of FIG. 11 which has been moved in a direction 740 such the door 704 is moved upwardly with respect to the frame 702. In this position, each of the tabs 712 and 718 are horizontally positioned with respective access portions 714 and 720 to provide for opening of the door 704 when the latch 724 is unlatched. Upon disengagement of the pin 732 from the tab 734 and positioning of the door as illustrated, the door 704 can be opened to provide access to the interior of the enclosure through an opening 742 such as is illustrated in FIG. 13.

Figure 12A:
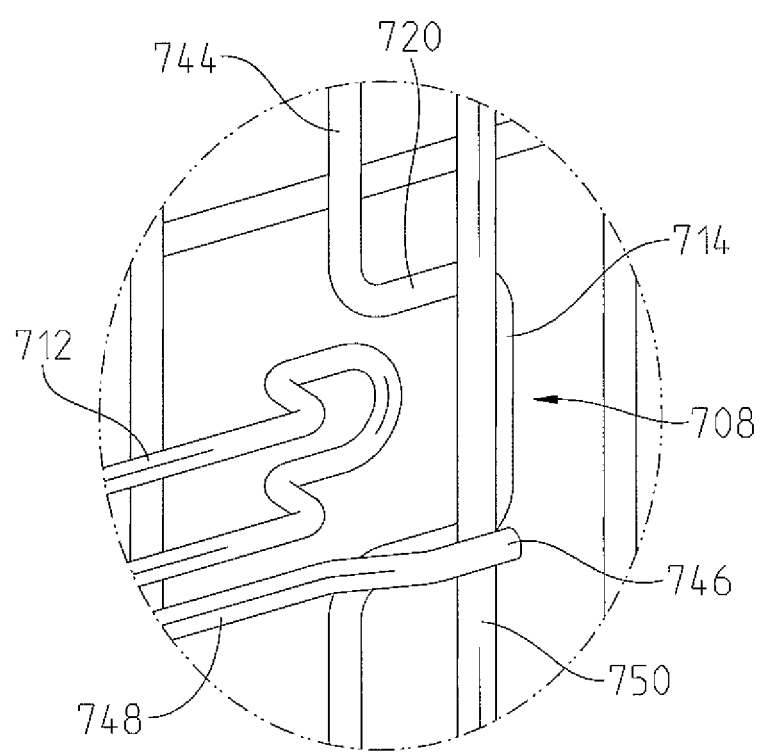
FIG. 12A is a perspective view of a door stop or catch of FIG. 12.
Figure 13:
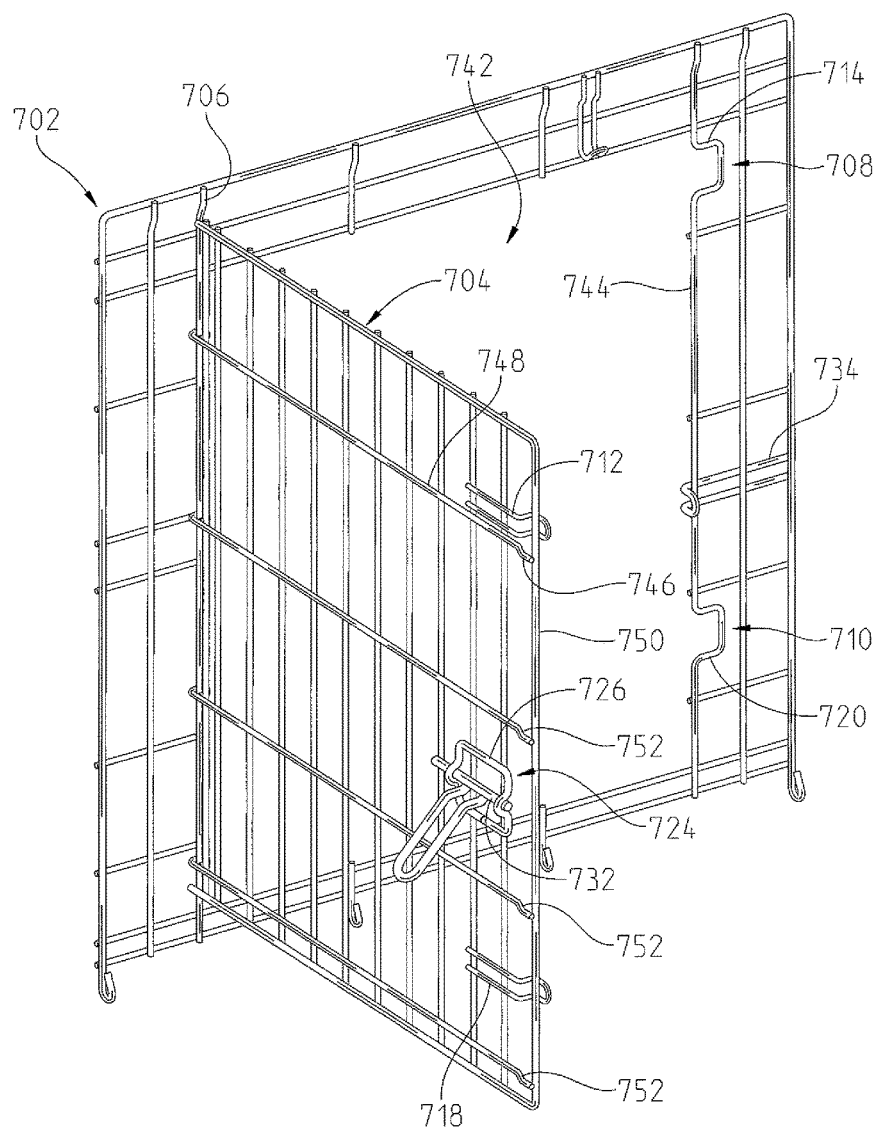
FIG. 13 is a perspective view of the door assembly of FIG. 11 in an open position.

As can be seen in FIG. 12A, which illustrates the stop 708, and in FIG. 13, the access portions 714 and 720 are formed as part of a vertical wire 744 which is one of the wires used to provide the frame 702. In this embodiment, the wire 744 is bent to define the access portion 714 and 720, each of which resembles a "U" shape. When latch 724 is moved to enable upward movement of the door and the tabs 712 and 718 are aligned with the access portions 714 and 720, the door 704 is moveable from the closed position to the open position. In this embodiment, the access portions 714 and 720 remain stationary during movement of the door 704 and the tabs 712 and 718 move with movement of the door 704, unlike previously described embodiments.

As also seen in FIG. 12A, the door includes a stop 746 which prevents the door 704 from swinging into the interior of the enclosure. In the illustrated the embodiment, the stop 746 is a portion of a horizontal wire 748. The stop 746 is spaced from a vertical wire 750 of the door 704 and defines a space between a front plane of the door 704 and the stop 746. The tab 712 defines a space between a back plane of the door 704. Consequently, in the closed position of FIG. 11, the tabs 712 and 718 are located in the interior of the enclosure and the stop 746 and a plurality of additional stops 752 are located outside of the enclosure. The tab 712, unlike previously described tabs, is fixed to the door 704, and moves as the door 704 moves. The access portions are fixed to the frame.

Figure 14:
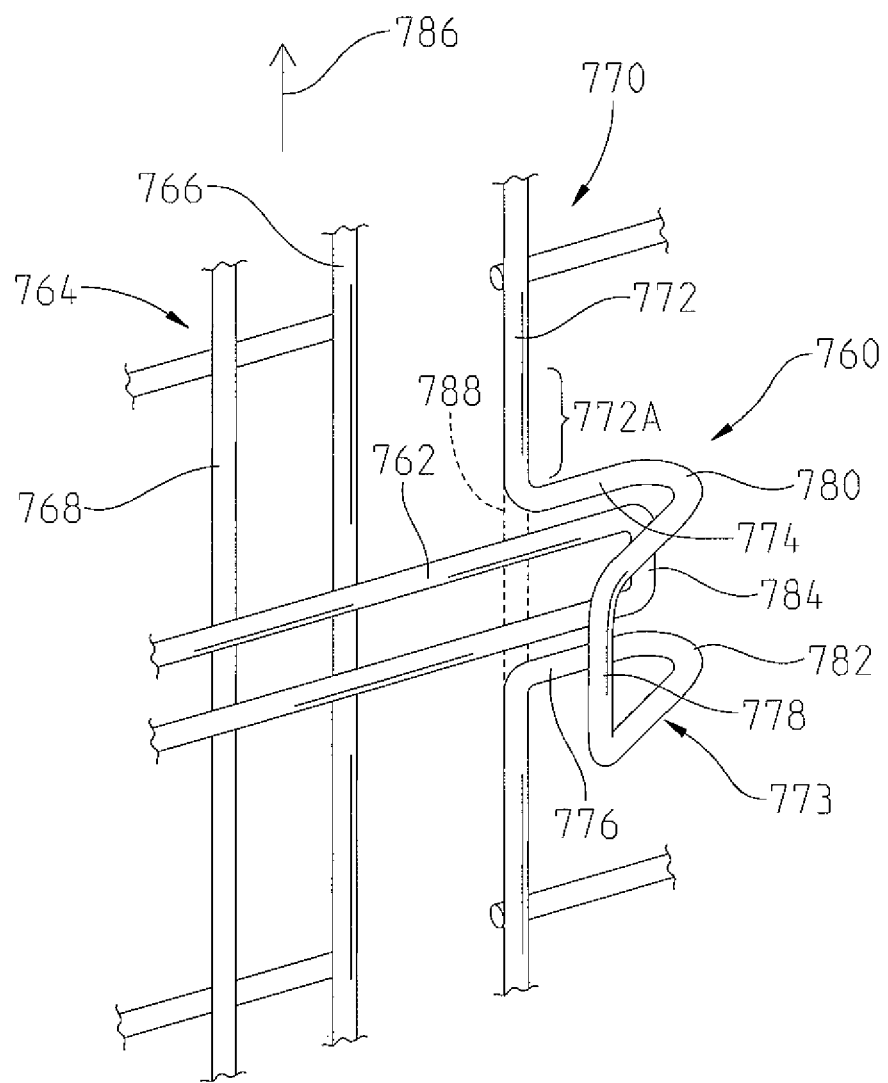
FIG. 14 is a perspective view of another embodiment of a door stop or catch.

FIG. 14 illustrates another embodiment of a door stop 760. In this configuration, an extension tab 762 is fixedly coupled to a door 764, only a portion of which is shown. The door 765 includes vertically and horizontally located wire, wherein the extension tab 762 is coupled to a vertical wire 766 and a vertical wire 768. A door frame 770, a portion of which is shown, includes a vertical wire 772 formed to include a blocking portion 773. In this embodiment, the blocking portion 773 prevents opening of the door 764 when the extension tab 762 is horizontally positioned between a first portion 774 and a second portion 776 of the blocking portion 773 which terminate at a blocking tab 778. The blocking tab 778 prevents or minimizes pivoting movement of door 764, when extension tab 762 is horizontally aligned with the blocking tab 778.

The blocking tab 778 is formed by a first bend 780 and a second bend 782 of the wire 772. At least one of the bends 780 and 782 includes an inside surface formed to be outside a terminating end 784 of the extension tab 762. Sufficient movement of the door 764 in a direction 786 moves the terminating end 784 outside of the blocking portion 773, such that sufficient pivotal movement of the door 764 is enabled to provide entry to and exit from the interior of the enclosure. In this embodiment, the access portion, which is a portion 772A of the vertical wire 772, does not prevent opening of the door, if the extension tab 762 is aligned with the portion 772A. The door 764, in another embodiment includes one or more extensions, such as extensions 746 and 752 of FIG. 13 to prevent the door from moving into the interior space. In another embodiment, the frame 770 includes a bar 788, shown in dotted outline in FIG. 14. Should the door 764 be pushed inward toward the interior of the enclosure, the extension 762 would come into contact with the bar 788, thereby preventing further inward movement. The bar 788 is either a part of the wire 772 or is a separate piece coupled to the wire.

Figure 15:
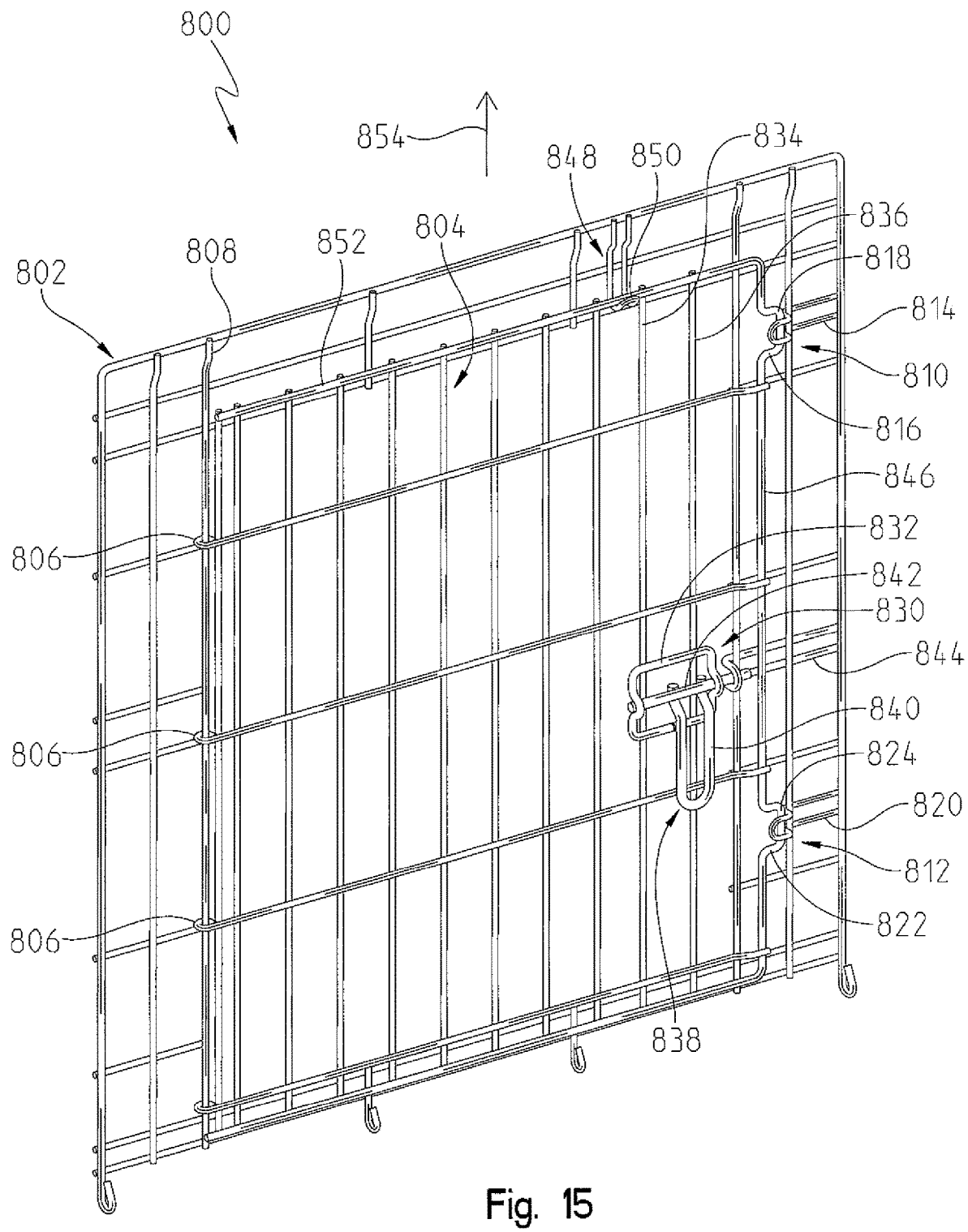
FIG. 15 is a perspective view of another embodiment of a door frame and door assembly.

FIG. 15 illustrates another embodiment of a door assembly 800 including a frame 802 and a door 804. In this embodiment, the door 804 includes a plurality of hooked ends 806 which surround a vertical wire 808 of the frame 802. The door 804 pivots about the vertical wire 808. The door assembly 800 includes a first door stop 810 and a second door stop 812. Each of the door stops 810 and 812 includes an access portion, a blocking portion, and a tab as described herein. In this embodiment, however, each of the tabs is fixedly coupled to the frame 802 and each of the access portions and blocking portions are configured as part of the door 804. Door stop 810 includes a tab 814, an access portion 816, and a blocking portion 818. Door stop 812 includes a tab 820, an access portion 822, and a blocking portion 824. The blocking portions 818 and 824 prevent opening of the door 804 when the door is in the lower position as illustrated in FIG. 15.

The door 804 includes a latch assembly 830 which is substantially similar in form and function as the latch assembly 624 of FIGS. 8, 9, and 10. The latch assembly 830 includes a latch support 832 which is fixed to a vertical wire 834 and a vertical wire 836, which also provide structure to the door 804. The latch support 832 supports a moveable latch 838 having a handle 840 fixedly coupled to a pin 842. The pin slidingly engages a tab 844.

The access portions 816 and 822 and the blocking portions 818 and 824 are defined by a vertical wire 846 of the door 804, which provides structure to the door 804. The frame 802 includes a retainer 848 coupled to the frame 802. A hook 850 of the retainer 848 engages a top wire 852 of the door 804 when the door 804 is in a closed position. By raising the door 804 in a vertical direction 854, the top wire 852 is disengaged from the hook 850 and the access portions 816 and 822 are respectively aligned with the tabs 814 and 820 such that the door 804 can be opened by pivoting the door 804 about the vertical wire 808.

In this embodiment, the tabs 814 and 820 each include terminating portions which extend away from a plane defined by the door 804 and to the exterior of the enclosure.

Figure 16:
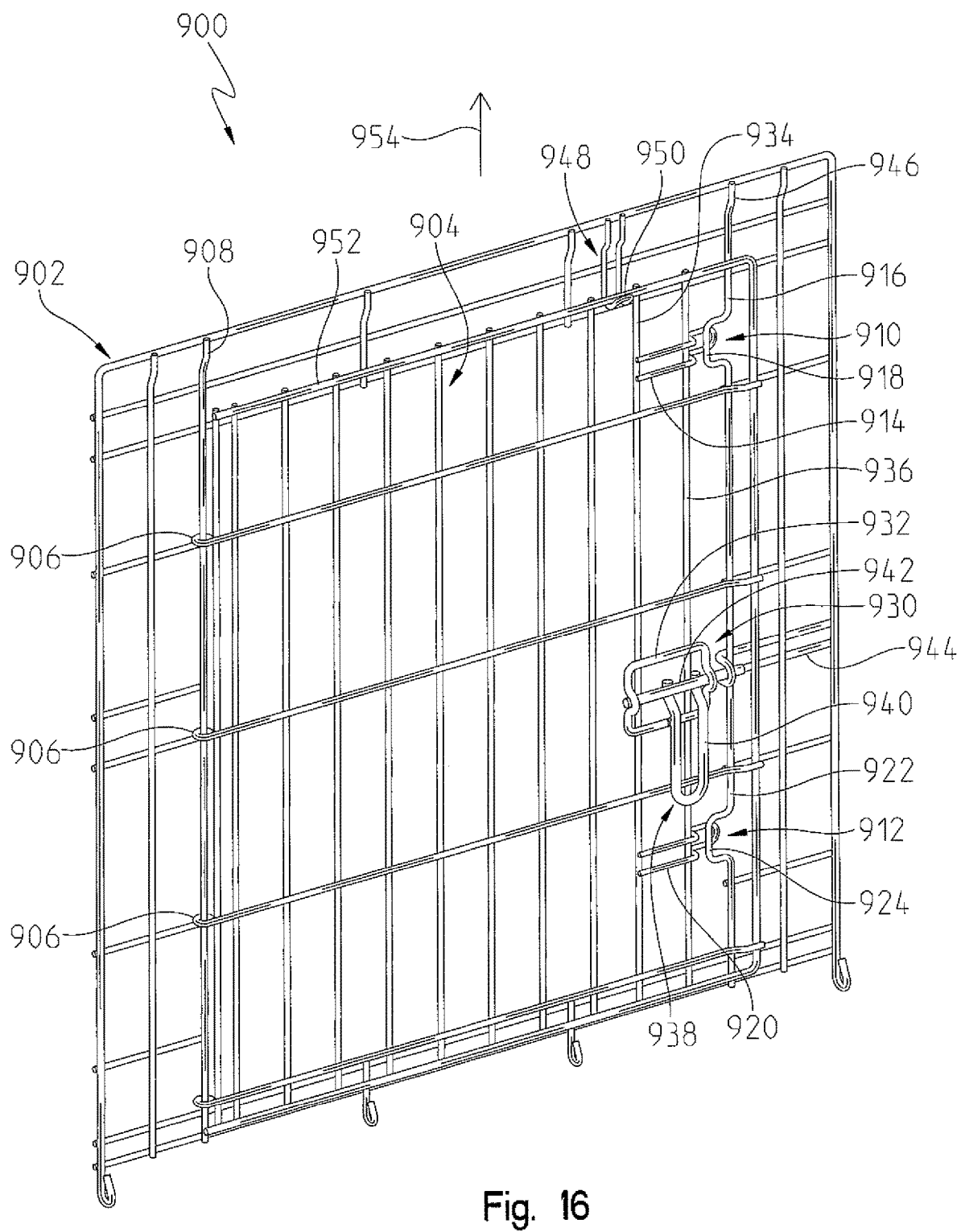
FIG. 16 is a perspective view of another embodiment of a door frame and door assembly.

FIG. 16 illustrates another embodiment of a door assembly 900 including a frame 902 and a door 904. In this embodiment, the door 904 includes a plurality of hooked ends 906 which surround a vertical wire 908 of the frame 902. The door 904 pivots about the vertical wire 908. The door assembly 900 includes a first door stop 910 and a second door stop 912. Each of the door stops 910 and 912 includes an access portion, a blocking portion, and a tab as described herein. In this embodiment, however, each of the tabs is fixedly coupled to the door 904 and each of the access portions and blocking portions are configured as part of the frame 902. Door stop 910 includes a tab 914, an access portion 916, and a blocking portion 918. Door stop 912 includes a tab 920, an access portion 922, and a blocking portion 924. The blocking portions 918 and 924 prevent opening of the door 904 when the door is in the lower position as illustrated in FIG. 16.

The door 904 includes a latch assembly 930 which is substantially similar in form and function as the latch assembly 624 of FIGS. 8, 9, 10. The latch assembly 930 includes a latch support 932 which is fixed to a vertical wire 934 and a vertical wire 936 which also provide structure to the door 904. The latch support 932 supports a moveable latch 938 having a handle 940 fixedly coupled to a pin 942. The pin slidingly engages a tab 944 to latch the door in a closed position.

The access portions 916 and 922 and the blocking portions 918 and 924 are defined by a vertical wire 946, which provides structure to the frame 904. The frame 902 includes a retainer 948 coupled to the frame 902. A hook 950 of the retainer 948 engages a top wire 952 of the door 904 when the door 904 is in a closed position. By raising the door 904 in a vertical direction 954, the top wire 952 is disengaged or separated from the hook 950 and the access portions 916 and 922 are respectively aligned with the tabs 914 and 920 such that the door 904 can be opened by pivoting the door 904 about the vertical wire 908.

As can be seen in the embodiment of FIG. 16, each of the tabs 914 and 920 is located behind the wire 946, in the interior of the enclosure. The wire 946 forms the access portions and the blocking portions. Consequently, if the latch 938 is unlatched but the door 904 is in the position illustrated of FIG. 16, the hook 950 and tabs 914 and 920 are blocked from moving to the exterior of the enclosure by the blocking portions 918 and 924 as well as by the wire 952 coming into contact with the hook 950.

The enclosure of FIG. 1 can be collapsed to a compact or stored structure. To do so, clips or fasteners are used, in different embodiments, for coupling each of the members to one another in the assembled position (FIG. 1). In other embodiments, relatively stiff wires acting as rods are threaded through hooks coupled to the members to secure the members in the appropriate locations. By removing the clips, fasteners, and or rods, the enclosure can be folded like an accordion to a compact position. In another aspect, each of the members may be hingedly or pivotally coupled to adjacent members and the entire enclosure can be folded or collapsed in an accordion-like manner.

Moreover, while the embodiments illustrated in this application relate to a wire crate whereby each side is formed by a plurality of interconnecting horizontal and vertical wires, this disclosure is applicable to other animal crates. For example, a plastic crate with a top, bottom, and sides formed of a plastic material may utilize a door and/or door frame as described herein. The plastic crate may have a design of any conventional style crate.

In another embodiment, other materials besides plastic may be used to form an animal enclosure that includes a door and door frame as described herein. Thus, the top, bottom, and sides may be formed of any material (plastic, wire rod, etc.) and include at least one door frame and door as described and shown in the embodiments herein.

While exemplary embodiments incorporating the principles of the present invention have been disclosed herein, the present invention is not limited to the disclosed embodiments. Instead, this disclosure is intended to cover any variations, uses, or adaptations of the invention using its general principles. For instance, other embodiments incorporating sliding movement of a door with respect to a frame to locate the features of the door stop in an aligned position which enables pivoting movement of a door are included. In addition, while different embodiments of the door frame and door assemblies are described with respect to the enclosure of FIG. 1, the described door frame and door assemblies are not limited in use with the described enclosure, but can be used with other enclosures. Further, this application is intended to cover such departures from the present disclosure as come within known or customary practice in the art to which this invention pertains and which fall within the limits of the appended claims.

The invention claimed is:

1. An animal enclosure, comprising:
a plurality of members defining an interior of the enclosure, where the plurality of members includes at least a first member;
a frame of the first member having a plurality of interconnected horizontal and vertical wires that define an opening for an animal to pass therethrough and to enter or exit the interior of the enclosure;
a door of the first member having a plurality of interconnected horizontal and vertical wires and being coupled to the frame, the door being pivotable about a pivot wire of the frame to move between an open position and a closed position,
a latch assembly having a handle structure, wherein the handle structure is configured to pivot with respect to one of the door and the frame and to latch the door in the closed position with respect to the frame; and
a door stop including an access portion, a blocking portion, and a tab, wherein either (a) one of the vertical wires of the frame or (b) one of the vertical wires of the door forms the access portion and the blocking portion, and the vertical wire (a) or (b) that does not form the access portion and the blocking portion is coupled to the tab, further wherein an alignment of the access portion and the tab at a first position of the door enables pivotable movement of the door with respect to the frame from the closed position to the open position and wherein in a second position of the door the blocking portion contacts the tab to prevent pivotable movement of the door to the open position,
wherein the tab is configured to move through the access portion or the access portion is configured to move such that the tab is passed therethrough during pivoting movement of the door with respect to the frame when the tab is aligned with the access portion.

2. The animal enclosure of claim 1 wherein sliding movement of the door with respect to the frame provides for the alignment of the tab with the access portion to enable movement of the door from the closed position to the open position.

3. The animal enclosure of claim 2 wherein one of the plurality of interconnected wires of the frame disposed along the opening defines the pivot wire of the frame.

4. The animal enclosure of claim 3 wherein at least two of the plurality of interconnected wires of the door each includes a hooked end that overlaps and contacts the pivot wire.

5. The animal enclosure of claim 4 wherein one of the hooked ends is disposed between adjacent wires of the plurality of interconnected wires of the frame which are inclined with respect to the pivot wire such that a space between the adjacent wires define a distance configured to enable the sliding movement of the door with respect to the frame.

6. The animal enclosure of claim 5 wherein the access portion defines a first area and the tab defines a second area smaller than the first area, wherein the alignment of the access portion with the tab enables movement of the door with respect to the frame from the closed position to the open position.

7. The animal enclosure of claim 6 wherein one of the plurality of interconnected wires of the frame disposed at a perimeter of the opening includes the access portion.

8. The animal enclosure of claim 2 wherein the tab includes a portion thereof extending from a plane defined by the frame.

9. The animal enclosure of claim 1 wherein the blocking portion includes a blocking tab extending from a plane of the frame and the access portion is a section of one of the horizontal and vertical wires of the frame adjacent to the tab.

10. The animal enclosure of claim 1 wherein the vertical wire (a) or (b) that forms the access portion and the blocking is bent to define the access portion.

11. An animal enclosure, comprising:
a plurality of members defining an interior of the enclosure, where the plurality of members includes at least a first member;
a frame of the first member having a plurality of interconnected horizontal and vertical wires that define an opening for an animal to pass therethrough and to enter or exit the interior of the enclosure;
a door of the first member having a plurality of interconnected horizontal and vertical wires and being coupled to the frame, the door being pivotable about a pivot wire of the frame to move between an open position and a closed position,
a latch assembly having a handle structure, wherein the handle structure is configured to pivot with respect to one of the door and the frame and to latch the door in the closed position with respect to the frame; and
a door stop including an access portion, a blocking portion, and a tab, wherein either (a) one of the vertical wires of the frame or (b) one of the vertical wires of the door forms the access portion and the blocking portion, and the vertical wire (a) or (b) that does not form the access portion and the blocking portion is coupled to the tab, further wherein an alignment of the access portion and the tab at a first position of the door enables pivotable movement of the door with respect to the frame from the closed position to the open position and wherein an alignment of the blocking portion with the tab at a second position of the door prevents movement of the door to the open position, wherein the access portion is defined by a U-shaped bend in the vertical wire (a) or (b) that forms the access portion and the blocking portion, wherein the vertical wire (a) or (b) that forms the access portion and the blocking portion is disposed at a perimeter of the door, and wherein the U-shaped bend includes an open portion aligned with the vertical wire (a) or (b) that is disposed at the perimeter of the door.

12. A door assembly for an animal enclosure, comprising:
a frame having a plurality of interconnected horizontal and vertical wires that define an opening for an animal to pass therethrough and to enter or exit an interior of the enclosure;
a door having a plurality of interconnected horizontal and vertical wires and being coupled to the frame, the door being pivotable about a pivot wire of the frame to move between an open position and a closed position,
a latch assembly having a handle structure, wherein the handle structure is configured to pivot with respect to one of the door and the frame and to latch the door in the closed position with respect to the frame; and
a door stop including an access portion, a blocking portion, and a tab, wherein either (a) one of the vertical wires of the frame or (b) one of the vertical wires of the door forms the access portion and the blocking portion, and the vertical wire (a) or (b) that does not form the access portion and the blocking portion is coupled to the tab;
wherein the tab restricts pivotal movement of the door relative to the pivot wire in the closed position of the door through contact with the blocking portion of the vertical wire (a) or (b), and
wherein the tab is configured to move through the access portion during pivoting movement of the door with respect to the frame when the tab is aligned with the access portion.

13. The door assembly of claim 12 wherein a vertical wire of the plurality of interconnected horizontal and vertical wires of the door disposed at a perimeter thereof forms the access portion, and wherein the access portion is defined by a U-shaped bend in the vertical wire of the door that is at the perimeter of the door.

14. The door assembly of claim 13 wherein at least one of the plurality of interconnected horizontal and vertical wires of the door includes a hooked end disposed between adjacent wires of the frame which are inclined with respect to the pivot wire of the frame such that a length of the pivot wire located between the adjacent wires defines a distance configured to limit the sliding movement of the door with respect to the frame.

15. The door assembly of claim 14 wherein the access portion defines a first area and the tab defines a second area smaller than the first area, wherein alignment of the access portion with the tab enables movement of the door with respect to the frame from the closed position to the open position.

16. The door assembly of claim 15 wherein alignment of the blocking portion with the tab prevents movement of the door with respect to the frame to the open position.

17. The door assembly of claim 16 wherein the tab includes a portion thereof extending from a plane defined by the frame.

18. The door assembly of claim 17 wherein one of the plurality of interconnected horizontal and vertical wires of the frame disposed directly adjacent to the opening defines the pivot wire of the frame structure.

19. The door assembly of claim 12 wherein the tab is spaced from a plane of one of the door and the frame, and wherein sliding moment of the door with respect to the frame moves the blocking portion away from the tab and aligns the access portion with the tab.

20. The door assembly of claim 19 wherein at least two of the plurality of interconnected horizontal and vertical wires of the door includes a hooked end, wherein the hooked ends circumscribe the pivot wire of the frame about which the door pivots.

21. The door assembly of claim 20 wherein the hooked end includes a space defining a slot which is configured to enable both sliding movement and pivoting movement of the door with respect to the frame.

22. The door assembly of claim 12 wherein the vertical wire (a) or (b) that forms the access portion and the blocking portion is bent to define the access portion.

* * * * *